United States Patent [19]

Hoshimi

[11] 4,085,940
[45] Apr. 25, 1978

[54] PHONOGRAPH RECORD PLAYER
[75] Inventor: Susumu Hoshimi, Yokohama, Japan
[73] Assignee: Sony Corporation, Tokyo, Japan
[21] Appl. No.: 751,180
[22] Filed: Dec. 16, 1976
[30] Foreign Application Priority Data
 Dec. 17, 1975 Japan .................................. 50-150896
[51] Int. Cl.² .............................................. G11B 17/06
[52] U.S. Cl. ................................... 274/15 R; 274/1 L
[58] Field of Search .................... 274/9 R, 15 R, 10 R, 274/1 L

[56] References Cited
U.S. PATENT DOCUMENTS

| 3,240,498 | 3/1966 | Grossenheider et al. | 274/10 R |
| 3,438,635 | 4/1969 | Hansen | 274/9 R |

*Primary Examiner*—Steven L. Stephan
*Attorney, Agent, or Firm*—Lewis H. Eslinger; Alvin Sinderbrand

[57] ABSTRACT

In a phonograph record player having a normal automatic operating cycle consisting of a lead-in operation initiated by actuation of a trigger for moving a tone arm from an elevated rest position outside the perimeter of the turntable to a set-down position on a phonograph record supported by the turntable, a play operation in which a pickup stylus carried by the tone arm engages the record at the set-down position and thereafter tracks the record groove for reproducing the sound recorded therein, and a return operation also initiated by operation of the trigger upon completion of the play operation for returning the tone arm to its rest position; a stop command signal for aborting the above automatic operating cycle and/or a repeat command signal for causing repetition of the automatic operating cycle is temporarily retained in a respective memory which provides a corresponding memory output, the completion of the lead-in operation and/or of the return operation is detected by a respective sensor to provide a corresponding sensor output, and, upon coincidence of the sensor output corresponding to completion of the lead-in operation or the return operation with the memory output corresponding to a retained or stored stop command signal or repeat command signal, respectively, an AND circuit provides an output for operating the trigger. Thus, the stop or repeat command signal can be generated, as by manual actuation of a respective switch, at any time during the automatic operating cycle and takes effect at an appropriate point in such cycle.

24 Claims, 55 Drawing Figures

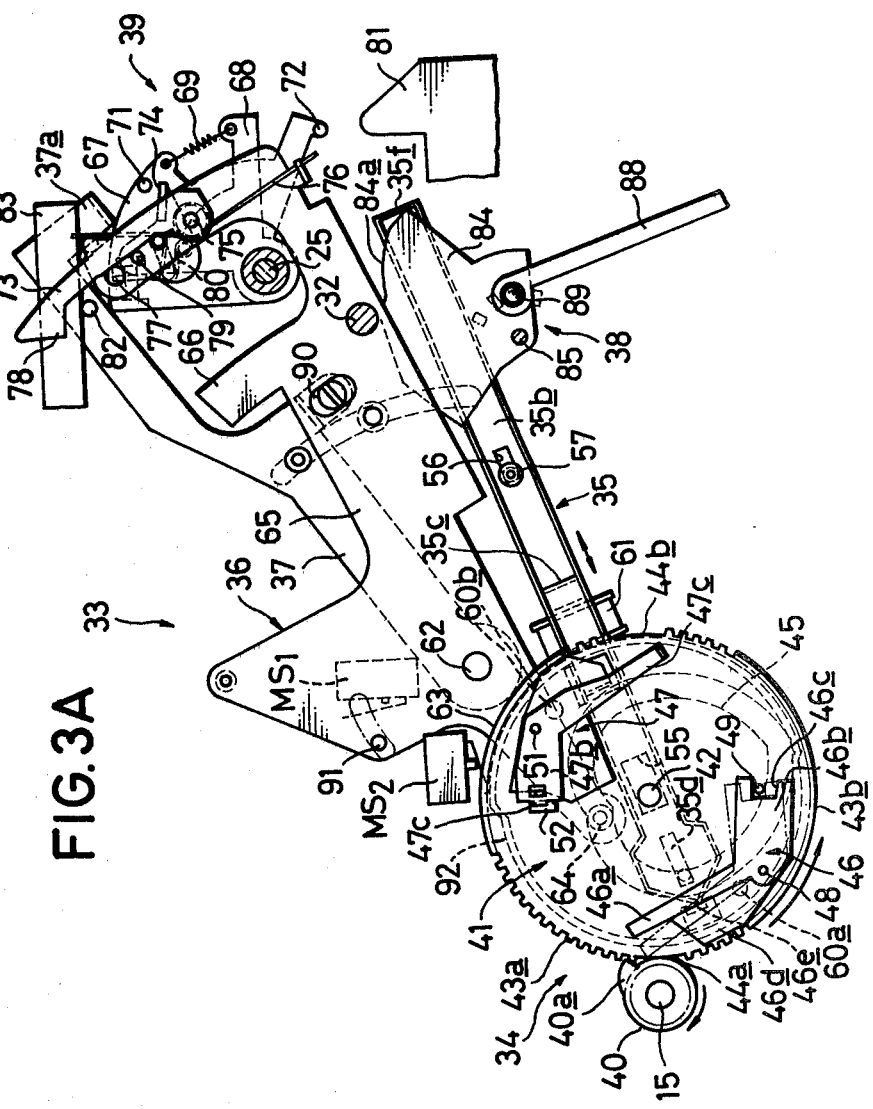

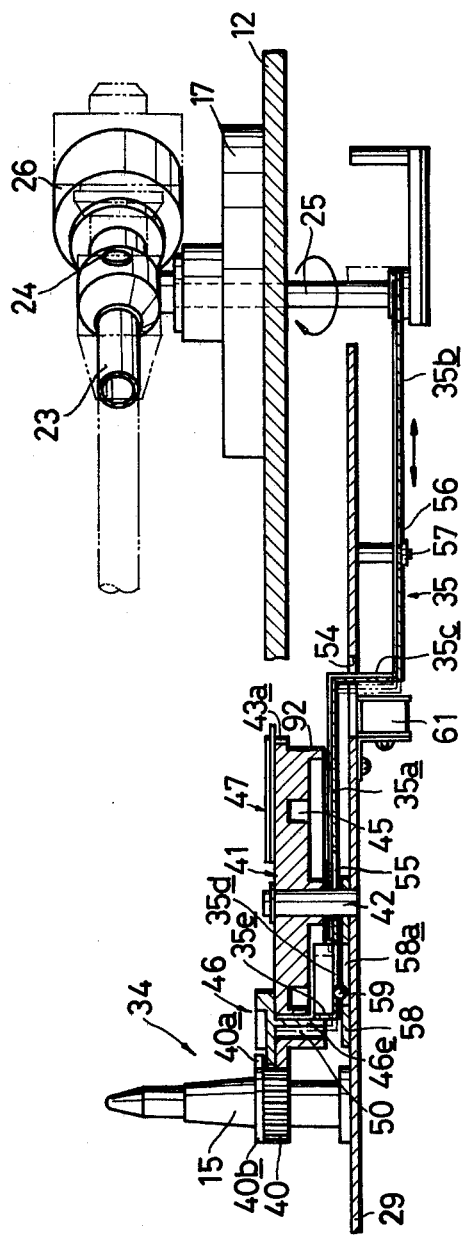

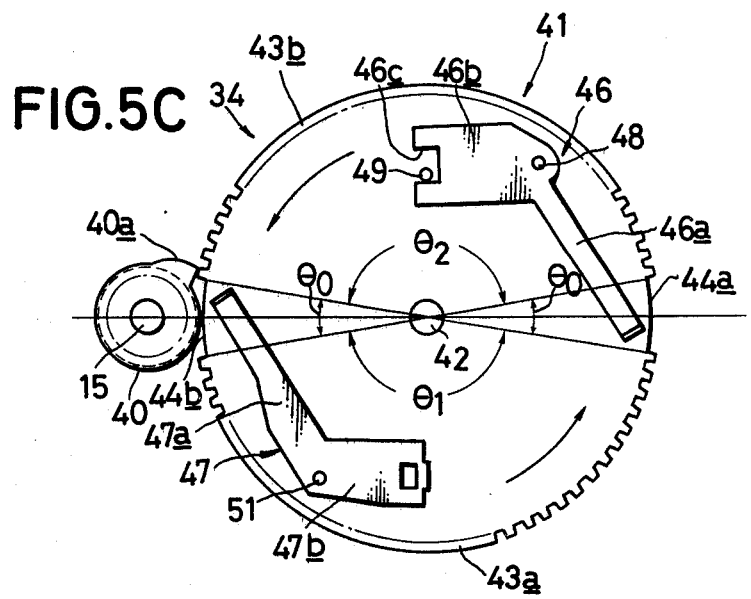
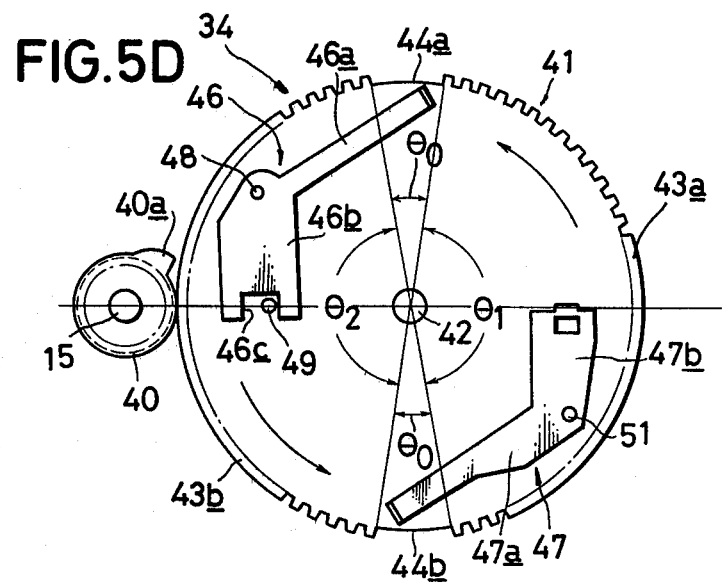

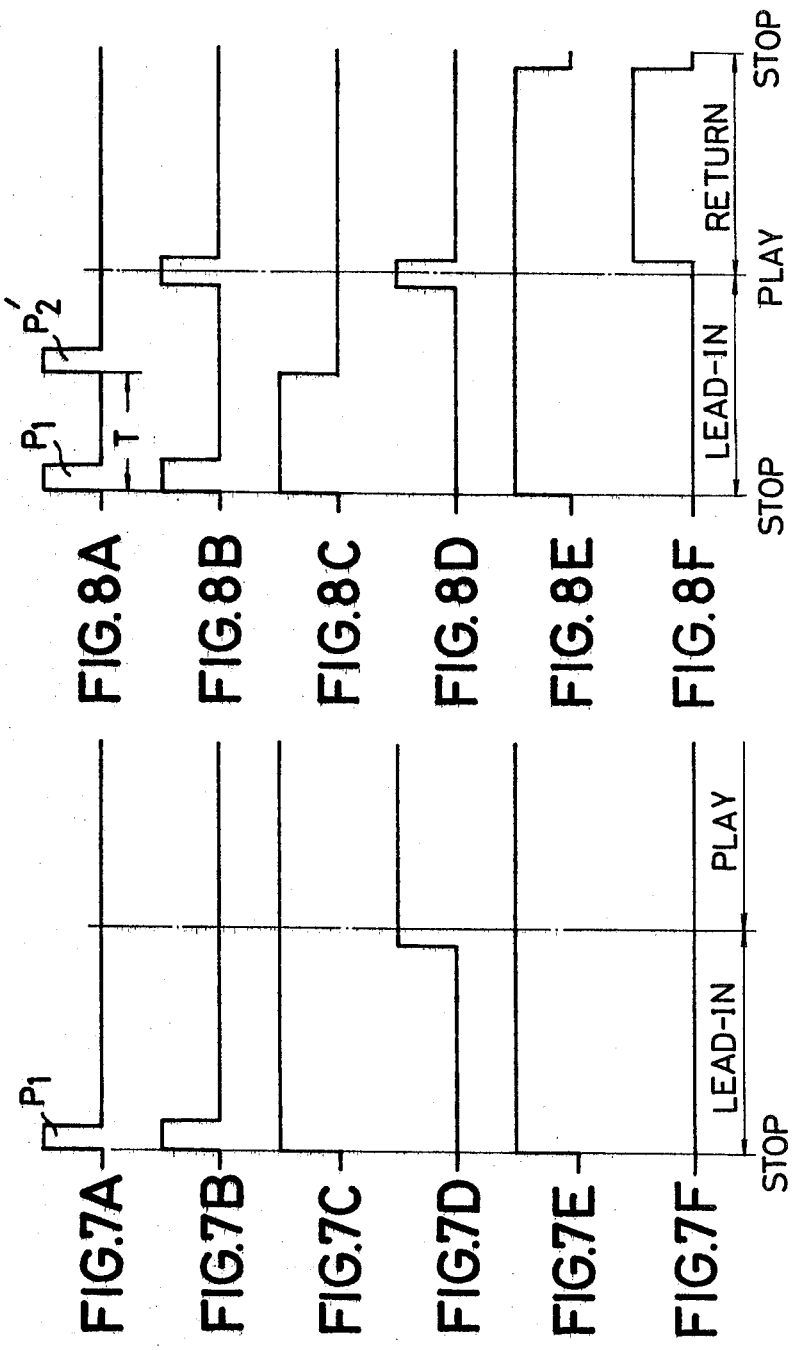

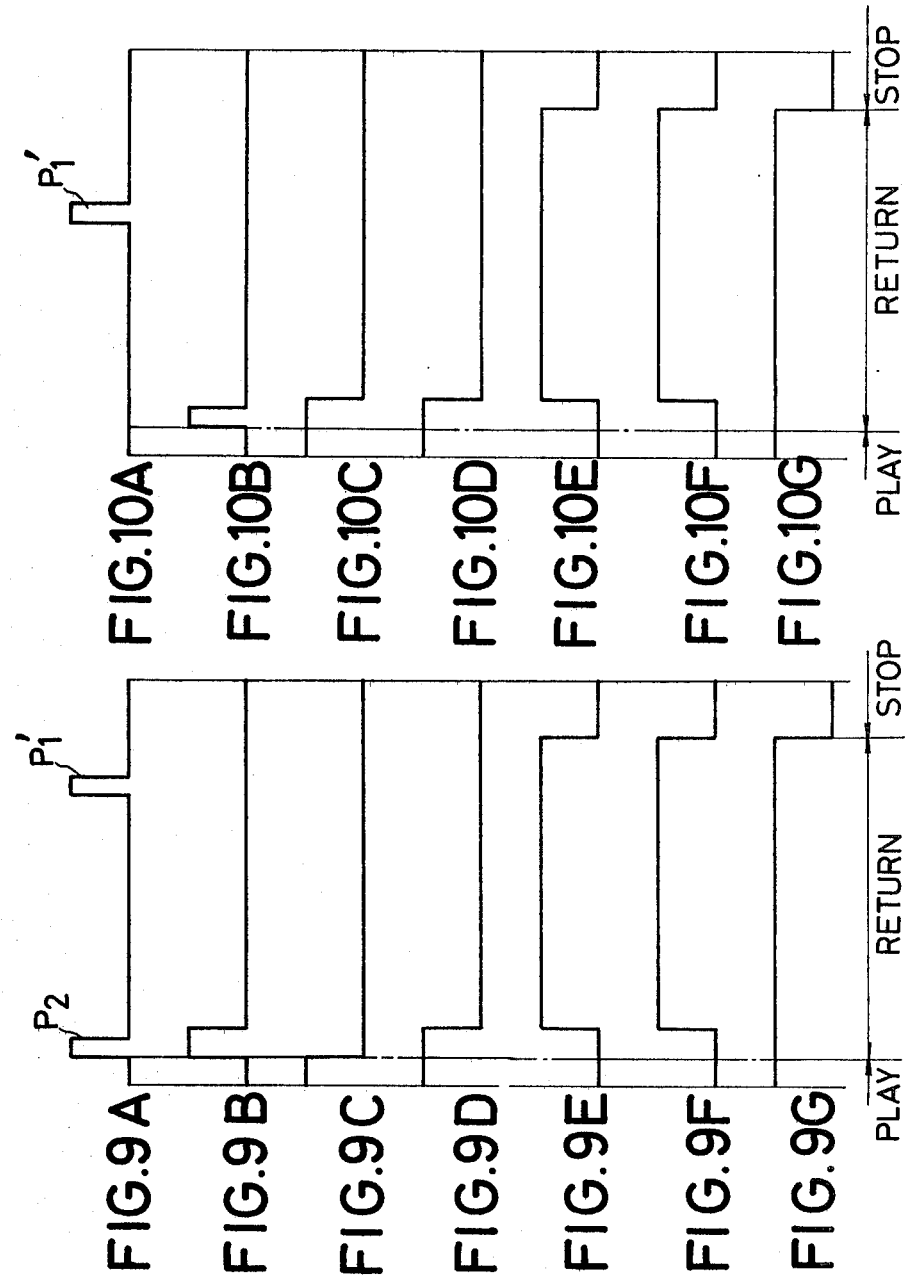

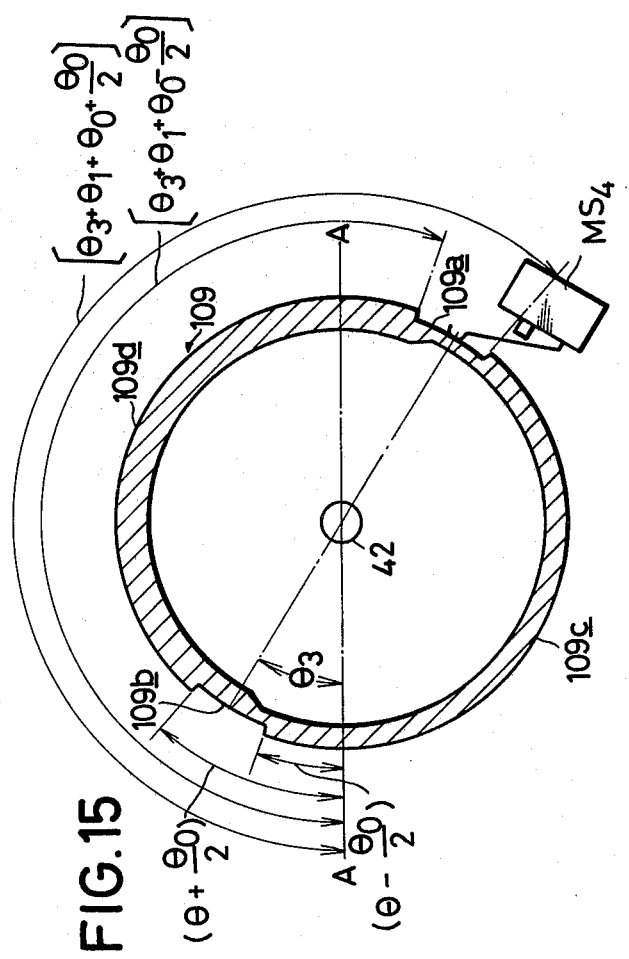

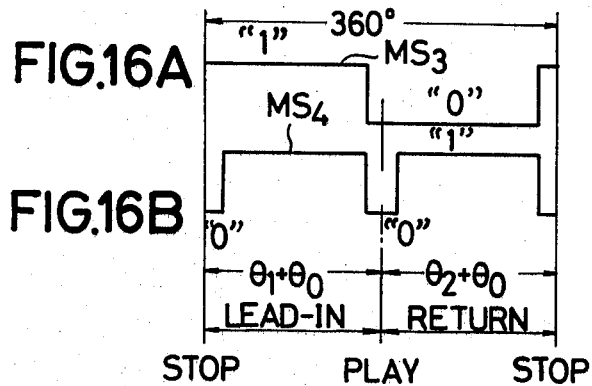
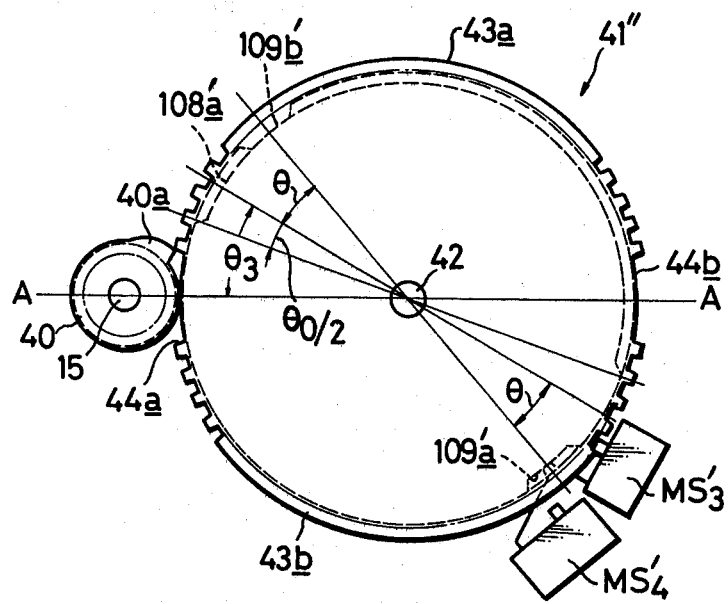

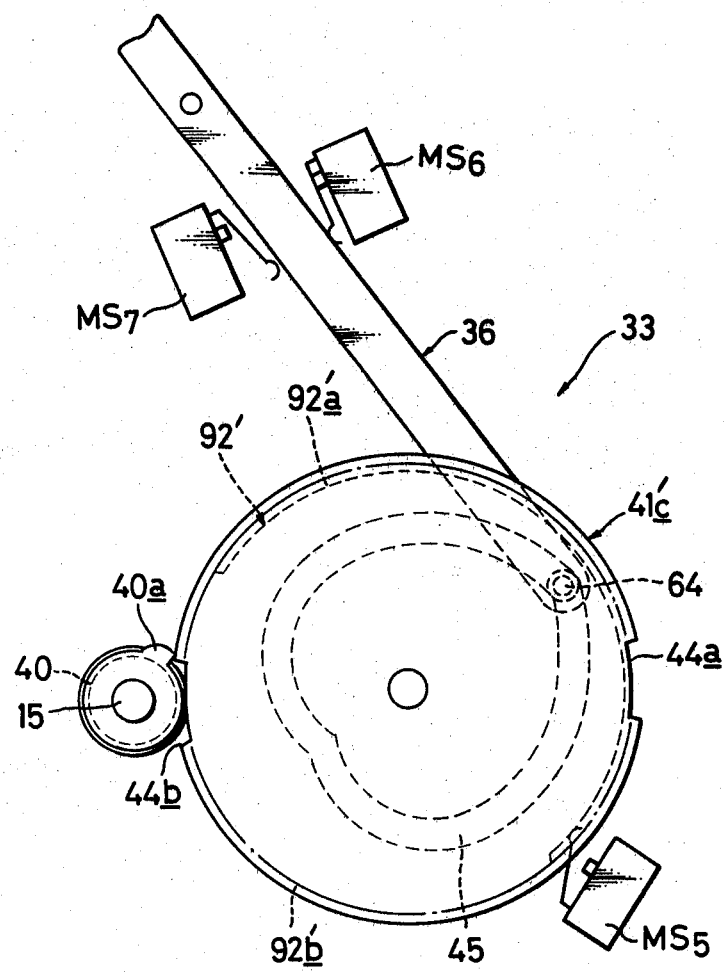

PHONOGRAPH RECORD PLAYER

BACKGROUND OF THE INVENTION

1. Field of the Invention

This invention relates generally to phonograph record players, and more particularly is directed to an electric control circuit by which automatic operations of a phonograph record player may be controlled in an improved manner.

2. Description of the Prior Art

Phonograph record players have been provided with an automatic operating cycle consisting of a lead-in operation for moving a tone arm from an elevated rest position outside the perimeter of the turntable to a set-down position on a phonograph record supported by the turntable, a play operation in which a pickup stylus carried by the tone arm engages the record at the set-down position and thereafter tracks the record groove for reproducing the sound recorded therein, and a return operation initiated upon completion of the play operation of returning the tone arm to its rest position. In a well known existing phonograph record player having the foregoing normal automatic operating cycle, the control mechanism thereof includes a drive gear rotatable with the turntable and engageable with peripheral teeth on a control gear for turning the latter to effect the lead-in and return movements of the tone arm by means of a lever assembly having a cam follower engaging a cam formed on the control gear. The peripheral teeth of the control gear have toothless gaps selectively facing the drive gear in stop and play positions, respectively, of the control gear, that is, when the tone arm is in its rest position and during a play operation, respectively, clutch means are actuable for initiating engagement of the control gear with the drive gear and thereby causing turning of the control gear from its stop position to its play position in the lead-in operation and from its play position to its stop position in the return operation. An actuator or trigger is operable for actuating the clutch means, and a manually controllable mechanism is provided for operating the trigger and initiating a lead-in operation either at the commencement of the normal automatic operating cycle or at the completion of a return operation when a repeat mode of operation is desired. The mechanism for operating the trigger is also responsive to the position of the tone arm at the completion of a play operation for then operating the trigger and automatically initiating the return operation. However, in the described existing phonograph record player, manually introduced commands for controlling the operations thereof are processed or transmitted completely in a mechanical manner, with the result that such commands can be effective only when given or introduced with the record player in either its stop mode or play mode. In other words, a stop command for aborting the automatic operating cycle and a repeat command for effecting repetition of the automatic operating cycle cannot be given during the lead-in operation and the return operation, respectively. Further, the existing phonograph record player is not provided with lamps or other indicators for visually indicating the operating modes of the record player at all times during its automatic operating cycle. Accordingly, the user of the phonograph record player has to observe the position of the tone arm and/or the position of a control knob or the like by which stop and/or repeat commands are introduced in order to determine the existing operating mode of the record player and whether, in such operating mode, the record player may be made to comply with a stop command or a repeat command.

OBJECTS AND SUMMARY OF THE INVENTION

Accordingly, it is an object of this invention to provide an improved phonograph record player which overcomes the above described disadvantages of the existing phonograph record players.

More specifically, it is an object of this invention to provide an improved phonograph record player having a normal automatic operating cycle, as aforesaid, and in which the user can actuate a switch or other manually actuable device for generating or producing a stop command signal at any stage of the automatic operating cycle, and particularly during the lead-in operation thereof, so as to effect a return operation for aborting the automatic operating cycle either immediately upon the generation of the stop command signal during a play operation or, in the event that the stop command signal is generated during the lead-in operation, immediately upon completion of such lead-in operation.

Another object of the invention is to provide an improved phonograph record player having an automatic operating cycle, as aforesaid, and in which the user can actuate a switch or other manually actuable device for generating a repeat command signal or a repeat-halt command signal at any time during the automatic operating cycle so as to achieve repetition of the automatic operating cycle until such time as a repeat-halt command signal is similarly generated for causing restoration of the record player to its stop mode at the conclusion of an automatic operating cycle.

A further object is to provide a phonograph record player, as aforesaid, with indicators for visually indicating the mode of operation of the record player at all stages of its automatic operating cycle.

In accordance with an aspect of this invention, in a phonograph record player having an automatic operating cycle as described above, a stop command signal for aborting the automatic operating cycle and/or a repeat command signal for causing repetition of the automatic operating cycle is temporarily retained in a respective memory which provides a corresponding memory output, the completion of the lead-in operation and/or of the return operation is detected by a respective sensor to provide a corresponding sensor output, and, upon coincidence of the sensor output corresponding to completion of the lead-in operation or the return operation with the memory output corresponding to a retained stop command signal or repeat command signal, respectively, an AND circuit provides an output for operating the trigger and thereby initiating the return operation or the lead-in operation, respectively.

In accordance with another feature of this invention, the memory for retaining the repeat command signal is adapted to alternatively retain a repeat-halt command signal which may be generated at any time during the automatic operating cycle so that the coincidence of the output of the memory corresponding to a retained repeat-halt command signal with the sensor output corresponding to the completion of the return operation at the end of an automatic operating cycle causes a respective AND circuit to provide a corresponding output by which the stop mode of the record player is established.

The above, and other objects, features and advantages of this invention, will be apparent in the following detailed description of illustrative embodiments of the invention which is to be read in connection with the accompanying drawings.

BRIEF DESCRIPTION OF THE DRAWINGS

FIGS. 3A and 3B are enlarged plan views showing a control mechanism of the record player in its stop or rest condition and in its play condition, respectively;

FIG. 4 is an enlarged sectional view taken along the line IV—IV on FIG. 2;

FIGS. 5A-5D are enlarged plan views of a control gear included in the control mechanism of FIGS. 3A and 3B, and which is shown in its stop position, in a position during a lead-in operation, in its play position, and in a position during the return operation, respectively;

FIGS. 7A-7F, FIGS. 8A-8F, 9A-9G and FIGS. 10A-10G are wave forms to which reference will be made in explaining the operation of the record player with the control circuit of FIG. 6;

FIGS. 14 and 15 are sectional views taken along the lines XIV—XIV— and XV—XV, respectively, on FIG. 13;

FIGS. 16A and 16B are wave forms to which reference will be made in explaining the operation of the sensor arrangement shown on FIGS. 12-15;

FIGS. 17 and 18 are views similar to that of FIG. 12, but showing respective modifications of the sensor arrangement;

FIGS. 23A and 23B are schematic plan views illustrating still another sensor arrangement associated with the control mechanism of a record player in accordance with this invention, and which show the stop condition and play condition, respectively, of the control mechanism;

DESCRIPTION OF THE PREFERRED EMBODIMENTS

Figure 1:
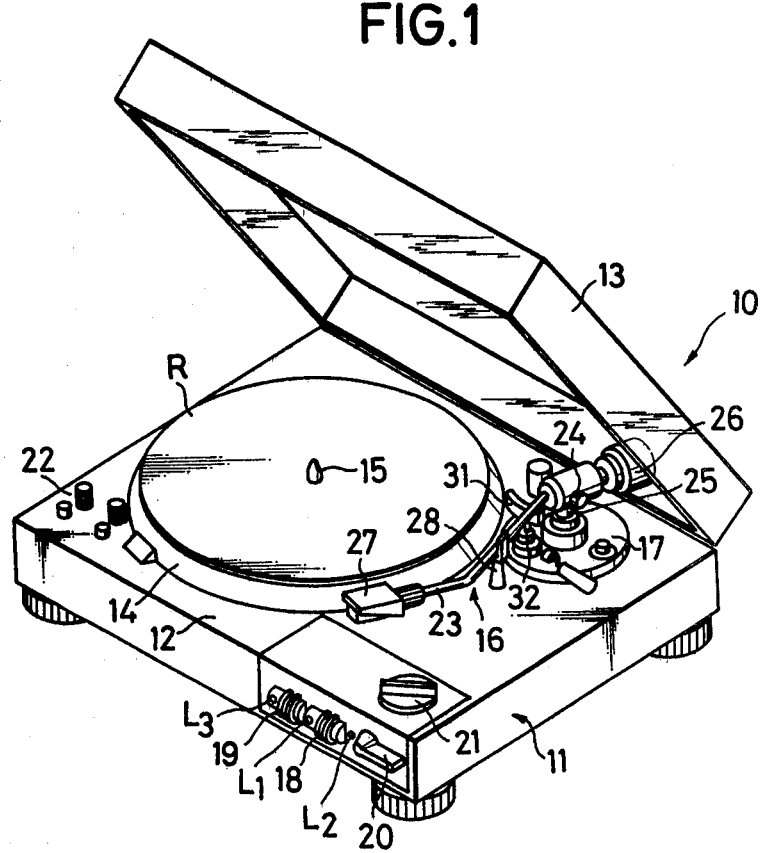
FIG. 1 is a perspective view of a phonograph record player of a type in which the present invention is desirably employed.

Referring to the drawings in detail, and initially to FIG. 1 thereof, it will be seen that an automatic phonograph record player 10 to which the present invention is desirably applied comprises a cabinet 11 having a deck or upper panel 12 and a pivoted dust cover 13 for enclosing a space above upper panel 12, a turntable 14 which is rotatably supported above upper panel 12 on a driving shaft or spindle 15, and a tone arm assembly 16 mounted on a tone arm support bracket 17 which is secured to a rear portion of upper panel 12 adjacent the perimeter of turntable 14. A start/stop switch actuator 18, a repeat/repeat-halt switch actuator 19 and a power ON-OFF switch actuator or knob 20 are mounted at the front of cabinet 11 adjacent one side of the latter, and a record size selecting knob 21 is mounted on upper panel 12 adjacent switch actuators 18-20. Further, speed selecting and regulating controls 22 are provided on upper panel 12 at the side of the latter remote from knob 21 and are manipulable for suitably selecting and regulating the speed of rotation of turntable 14.

The switch actuators 18 and 19 are desirably of the soft-touch type so as to be actuable in response to a light pressure of the user's hand or finger thereagainst. More particularly, in the illustrated record player 10 according to this invention, successive actuations of switch actuator 18 are intended to alternately provide start and stop command signals, while successive actuations of switch actuator 19 are intended to alternately provide repeat and repeat-halt command signals, as hereinafter described in detail.

The tone arm assembly 16 is shown to conventionally include an elongated tone arm 23 mounted adjacent one end, as by a gimbal 24, on the upper end of a vertical support shaft 25 which is rotatable in suitable bearings carried by bracket 17, a counterweight 26 extending from the mounted end of tone arm 23, and a head-shell 27 extending from the opposite or free end of tone arm 23 to accommodate a cartridge or pickup from which a stylus depends. By reason of such mounting of tone arm assembly 16, tone arm 23 is capable of lateral swinging movement about the vertical axis of shaft 25 across turntable 14 and also is capable of being raised and lowered about the horizontal axis of gimbal 24 relative to turntable 14 between an elevated rest position outside the perimeter of the turntable where tone arm 23 may be disposed on an arm rest 28, as shown on FIG. 1, and an inner position (not shown) which corresponds to the engagement of the pickup stylus in the conventional final non-recorded groove portion of a record R on turntable 14.

A chassis 29 (FIGS. 2 and 4) is suitably suspended under upper panel 12 of the cabinet, and an electric motor 30 (FIG. 2) is mounted below a portion of the chassis and directly drives the shaft 15 on which turntable 14 is mounted. An arcuate arm lifter 31 (FIG. 1) extends under tone arm 23 in all positions of the latter and is mounted on the upper end of a vertically movable shaft 32 which is slidable in a suitable bearing formed in a portion of support bracket 17 and being offset forwardly from tone arm support shaft 25. It will be apparent that tone arm 23 is raised and lowered in response to vertical movements of shaft 32 and of arm lifter 31 therewith.

Figure 2:
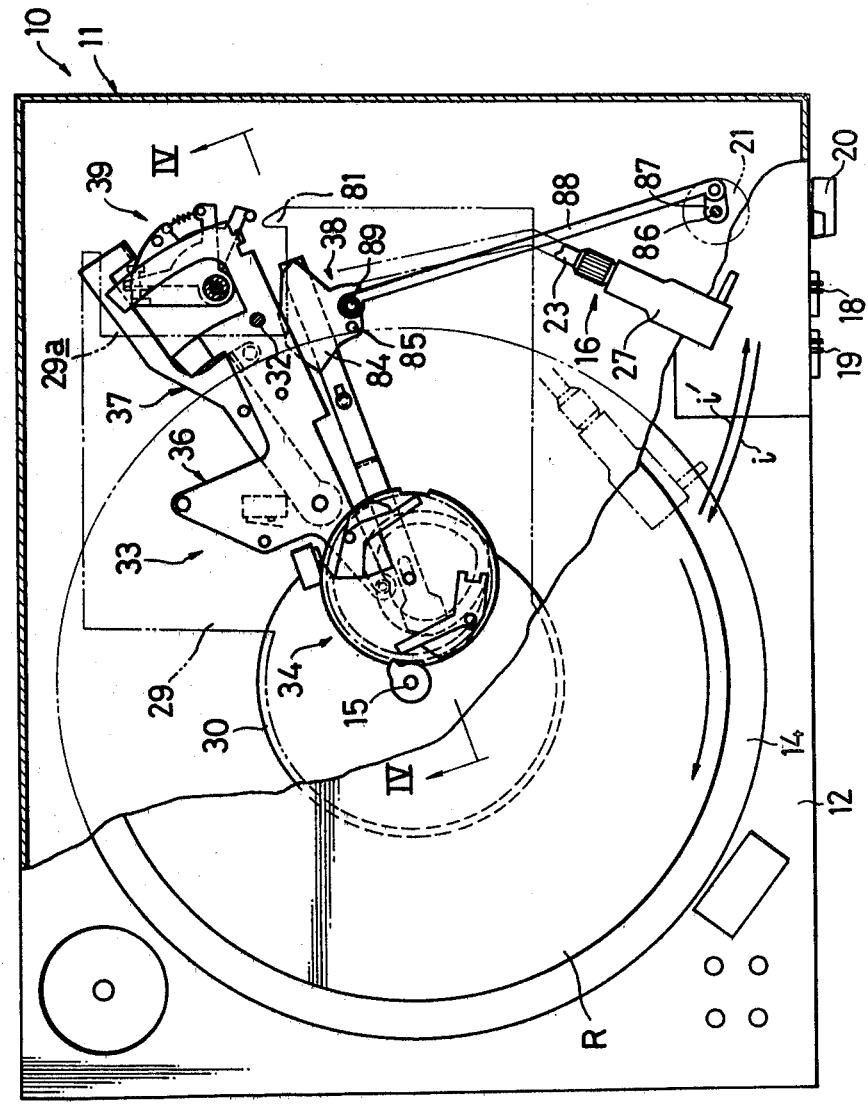
FIG. 2 is a top plan view of the record player of FIG. 1 with its turntable and an upper panel of its cabinet being partly broken away.
Figure 3B:
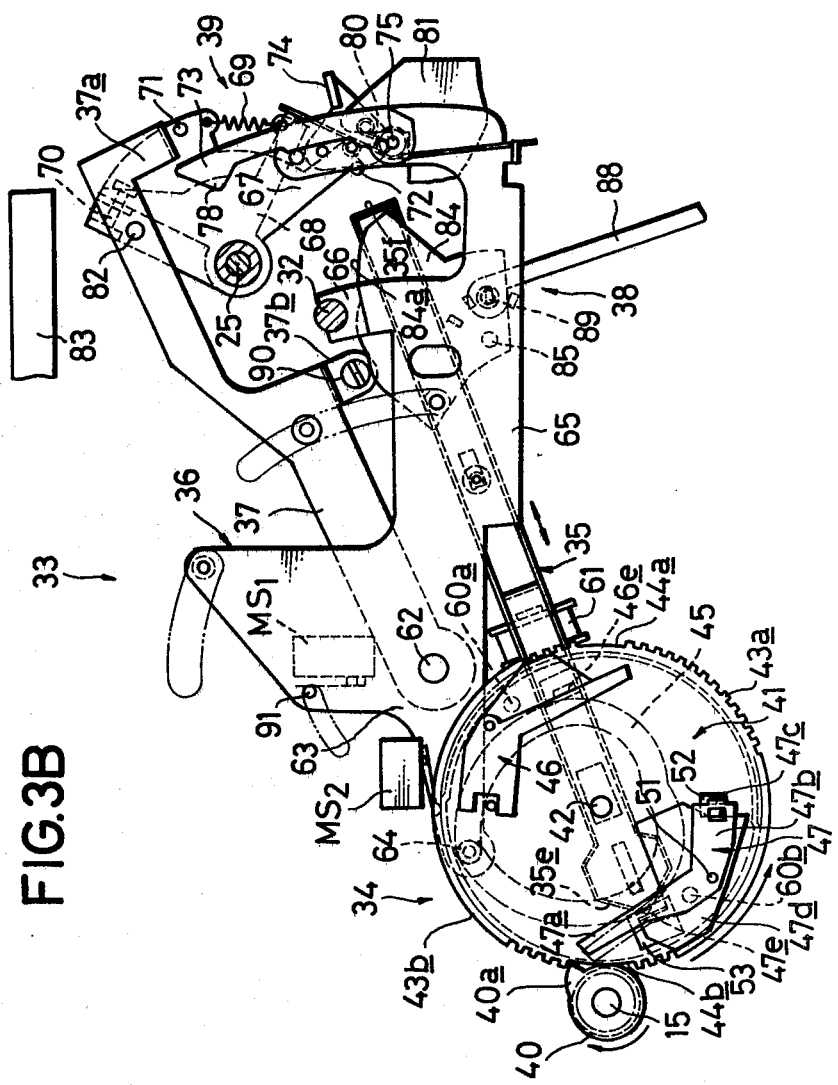

The illustrated record player 10 further comprises a control mechanism 33 which, as shown on FIGS. 2, 3A and 3B, is preferably of the type disclosed in detail in U.S. patent application Ser. No. 739,358, filed Nov. 5, 1976, and having a common assignee herewith. Such control mechanism 33 is shown to generally comprise a control gear assembly 34 operable from the driving shaft or spindle 15, an actuating slide or trigger 35 for initiating operations of control gear assembly 34, a main lever 36 movable in response to operation of control gear assembly 34, a lead-in lever 37 adapted to be coupled with main lever 36 for following the movement of the latter during swinging or lead-in of tone arm 23 to a predetermined set-down position, a record size selecting mechanism 38 for determining the set-down position under the control of knob 21, and a tone arm drive assembly 39 through which the lead-in and return swinging movements of tone arm 23 are effected in response to corresponding movements of main lever 36 and lead-in lever 37.

Figure 5A:
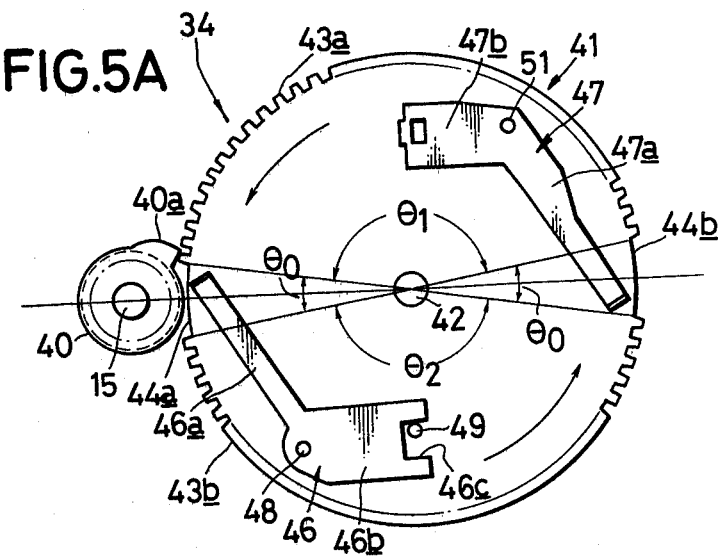
Figure 5B:
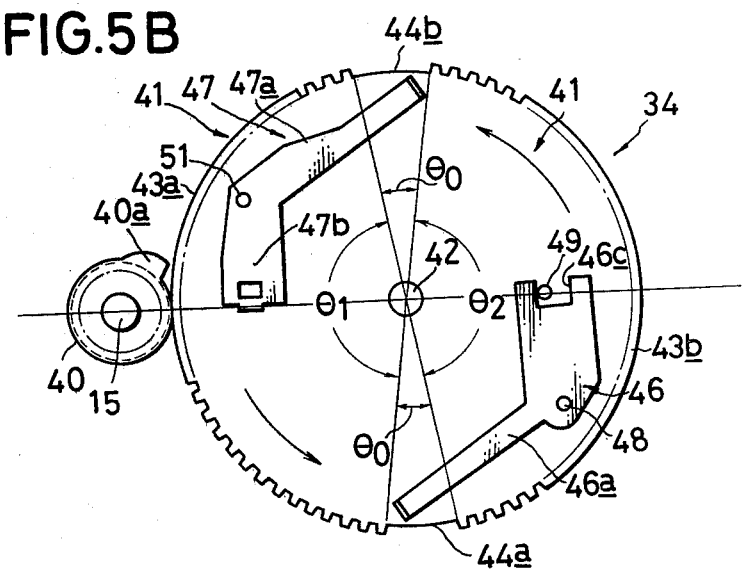

The control gear assembly 34 includes a drive gear or pinion 40 secured on drive shaft 15 above chassis 29, and a driven or control gear 41 which is rotatably mounted on a shaft 42 projecting upwardly from chassis 29. As shown particularly on FIGS. 5A-5D, the upper portion of the periphery of control gear 41 is formed with two sets of gear teeth 43a and 43b extending along portions of the circumference of control gear 41 that are enclosed by angles $\theta_1$ and $\theta_2$ of slightly less than 180°, with the sets of gear teeth 43a and 43b being separated from each other by diametrically opposed toothless gaps 44a and 44b each having the angular extent indicated at $\theta_o$. The shaft 42 supporting control gear 41 is positioned in respect to driving shaft 15 so as to provide meshing engagement of drive gear 40 with the set of teeth 43a or 43b when the respective set of teeth faces toward shaft 15 for driving gear 41 from the latter; whereas, shaft 15 and drive gear 40 can continue to rotate with control gear 41 remaining at rest when such gear 41 is disposed with either the toothless gap 44a or the toothless gap 44b facing toward shaft 15 in stop and play positions, respectively, of control gear 41, as shown on FIGS. 5A and 5C. During the engagement of gear teeth 43a with drive gear 40 (FIG. 5B) and the corresponding one-half revolution or lead-in movement of control gear 41, control mechanism 33 effects the lead-in of tone arm assembly 16 from its rest position to a predetermined set-down position of the stylus on a record and, during the engagement of gear teeth 43b with drive gear 40 (FIG. 5D) and the corresponding one-half revolution or return movement of control gear 41, control mechanism 33 effects the return of tone arm assembly 16 to its rest position, as hereinafter described in detail. As shown particularly on FIGS. 3A, 3B and 4, a heart-shaped cam groove 45 is formed in control gear 41 and opens downwardly at the lower surface of the latter for effecting the lead-in and return swinging movements of tone arm assembly 16 in response to turning of control gear 41.

In order to initiate the lead-in movement of control gear 41 from its stop position (FIGS. 3A and 5A) in which toothless gap 44a faces drive gear 40, and the return movement of gear 41 from its play position (FIGS. 3B and 5C) in which toothless gap 44b faces drive gear 40, control gear assembly 34 is further shown to comprise lead-in and return clutches 46 and 47, respectively, which are pivotally mounted at substantially diametrically opposed locations on the flat upper surface of control gear 41. The lead-in clutch 46 may be in the form of a lever pivoted, intermediate its ends, on a pin 48 projecting upwardly from control gear 41 and having oppositely directed arms 46a and 46b. The end of arm 46b has a cutout 46c therein which loosely receives a pin 49 projecting upwardly from control gear 41 for limiting the angular movement of lead-in clutch 46 to the disengaged and engaged positions thereof shown in full and broken lines, respectively, on FIG. 3A. Clutch 46 further has a cam portion 46d extending outwardly from arm 46a so as to project radially beyond the teeth 43b of control gear 41 when clutch 46 is in its engaged position. As shown, lead-in clutch 46 is dimensioned and its pivot pin 48 is located so that, in the engaged position of clutch 46, the free end of arm 46a projects above toothless gap 44a of control gear 41. Finally, a projection 46e (FIGS. 3A, 3B and 4) depends from arm 46a and extends downwardly through a hole 50 in control gear 41 so as to be actuable by slide 35, as hereinafter described in detail.

The return clutch 47 may be generally similar to lead-in clutch 46 and is shown to be in the form of a lever pivoted, intermediate its end, on a pin 51 projecting upwardly from control gear 41 and having oppositely directed arms 47a and 47b. Clutch 47 is dimensioned and its pivot pin 51 is located so that, in an engaged position of clutch 47, as indicated in broken lines on FIG. 3B, the free end of arm 47a projects above toothless gap 44b of control gear 41. The end of arm 47b has a depending tab 47c engaging in a cutout 52 in control gear 41 for limiting the angular movement of return clutch 47 to the disengaged and engaged positions shown in full and broken lines, respectively, on FIG. 3B. Clutch 47 further has a cam 47d associated therewith and extending outwardly in respect to arm 47a so as to project radially beyond the teeth 43a of control gear 41 when clutch 47 is in its engaged position. Finally, a projection 47e shown in broken lines on FIG. 3B depends from arm 47a and extends downwardly through a hole 53 in control gear 41 so as to be actuable by slide 35, as hereinafter described in detail.

Control gear assembly 34 is completed by an abutment or nose 40a extending radially outward from a rim 40b integral with drive gear 40 at the top of the latter. Thus, when lead-in clutch 46 is displaced to its engaged position with gear 41 in its stop position (FIG. 3A), abutment 40a in rotating with drive gear 40 acts on the end of lever arm 46a to propel the latter longitudinally and thereby initiate turning of control gear 41 until gear teeth 43a mesh with drive gear 40 for effecting the lead-in movement of gear 41. Similarly, when return clutch 47 is displaced to its engaged position with control gear 41 in its play position (FIG. 3B), abutment or nose 40a acts on the end of layer arm 47a to propel the latter longitudinally and thereby initiate turning of gear 41 until gear teeth 43b mesh with drive gear 40 for effecting the return movement of gear 41.

As shown particularly on FIG. 4, actuating slide 35 is constituted by an elongated member formed with a step at its middle portion so as to have upper and lower horizontal portions 35a and 35b respectively disposed above and below chassis 29 and being connected by a vertical portion 35c which extends through an opening 54 in the chassis. Upper horizontal portion 35a extends between chassis 29 and the underside of control gear 41 and is formed with an elongated hole 55 through which shaft 42 extends. An elongated hole 56 is formed in lower horizontal portion 35b and receives a grooved guide roller 57 carried by a post depending from chassis 29. Further, a ball receiver 58 is fixed on chassis 29 under control gear 41 and is formed with a slit 58a along which a ball 59 is free to roll, and the free end portion of upper horizontal portion 35a is formed with a slit 35d aligned with slit 58a and also receiving ball 59, from which it follows that actuating slide 35 is guided for free longitudinal sliding movement in respect to chassis 29 between the inoperative position shown on FIGS. 3A, 3B and 4 and an operative position displaced toward the left from such inoperative position, as viewed on the drawings. Further the free end of upper horizontal portion 35a of slide 35 is formed with an upwardly directed, V-shaped projection 35e which is selectively engageable with the projection 46e of clutch 46 when control gear 41 is in its stop position (FIG. 3A), or with the projection 47e of clutch 47 when control gear 41 is in its play position (FIG. 3B) for actuating the respective clutch 46 or 47 to its engaged position in response to longitudinal movement of slide 35 to its operative position. As shown in broken lines on FIGS. 3A and 3B, diametrically opposed pins 60a and 60b depend from control gear 41 at locations in advance of toothless gaps 44a and 44b, respectively, considered in the counter-clockwise direction of rotation of control gear 41, and such pins 60a and 60b are radially positioned with respect to the axis of gear 41 so that, near the conclusion of the lead-in movement or the return movement of control gear 41, pin 60b or 60a, respectively, will act against a sloping flank of the V-shaped projection 35e on actuating slide 35 for returning the latter from its operative position to its inoperative position shown on FIGS. 3A, 3B and 4.

At least the vertical portion 35c of actuating slide 35 is formed of a magnetic material, and an electromagnet 61 is supported by a suitable bracket at the underside of chassis 29 adjacent opening 54 of the latter so that, upon energizing of electro-magnet 61, as hereinafter described in detail, the resulting magnetic field will attract vertical portion 35c of slide 35 and thereby move the latter toward the left, as viewed on FIG. 4, for displacement of slide 35 from its inoperative position to its operative position.

As shown particularly on FIGS. 3A and 3B, main lever 36, which is disposed above chassis 29, is pivoted, intermediate its ends, on the upper portion of a pivot pin 62 supported by chassis 29 at a location between shaft 42 of control gear 41 and support shaft 25 of tone arm assembly 16. Main lever 36 includes an arm 60 extending in the direction from pivot pin 62 under control gear 41, and such arm 63, at its free end, carries an upwardly directed cam follower roller 64 which engages in cam groove 45 for angularly displacing main lever 36 between a stop position (FIG. 3A) and a play position (FIG. 3B) in response to turning of control gear 41. Main lever 36 further includes an arm 65 extending from pivot pin 62 substantially in the direction opposed to arm 63 and reaching under shaft 32 of arm lifter 31 so as to support shaft 32 at the lower end of the latter. At the portion of lever arm 65 where the latter is engaged by shaft 32, a downwardly inclined ramp 66 is directed rearwardly from lever arm 65 so as to move under shaft 32 in the play position of main lever 36 (FIG. 3B). Thus, arm 65 of main lever 36 supports shaft 32 and arm lifter 31 in an elevated position corresponding to a raised position of tone arm 16 when main lever 36 is in its stop position and during lead-in and return movements of main lever 36. However, at the conclusion of lead-in movement of main lever 36, that is, when main lever 36 attains its play position (FIG. 3B), downwardly inclined ramp 66 moves under shaft 32 to permit downward movement of the latter and of arm lifter 31 therewith so that tone arm 23 is lowered for engagement of the pickup stylus with a record on turntable 14.

The tone arm drive assembly 39 is shown to include upper and lower, generally sector-shaped members 67 and 68, respectively, mounted on the lower end portion of tone arm support shaft 25 so as to be turntable about the axis of the latter. The lower member 68 is suitably fixed to shaft 25 so as to be rotatably coupled with the latter, while the upper member 67 is angularly displaceable about the axis of shaft 25 relative to lower member 68. A tension spring 69 is connected between members 67 and 68 for urging member 67 in the clockwise direction to the relative position shown on FIGS. 3A and 3B and which is determined by a set screw 70 shown in broken lines on FIG. 3B. Pins 71 and 72 are directed upwardly from sector-shaped member 67 at spaced apart locations adjacent the periphery of the latter. As hereinafter described in detail, pin 71 is adapted to be acted upon for causing the lead-in and return swinging movements of tone arm assembly 16. On the other hand, pin 72 is positioned so that it may act against the free end 35f of the lower horizontal portion of actuating slide 35 for mechanically moving the latter from its inoperative position to its operative position when tone arm assembly 16 is angularly displaced, at the conclusion of a record playing operation, to the position which corresponds to the engagement of the pickup stylus in the final non-recorded turns of the record groove.

In order to ensure that manual interference with the lead-in or return swinging movements of tone arm 23 will not cause damage to automatic control mechanism 33, the tone arm drive assembly 39 is further shown to include a hooked lead-in drive member 73 and a return drive member 74. The lead-in drive member 73 is pivotally mounted on, and extends rearwardly from a pivot pin 75 directed upwardly from the free end portion of main lever arm 65. A torsion spring 76 urges drive member 73 in the counter-clockwise direction relative to lever arm 65 so as to normally engage drive member 73 with a stop pin 77. The free or rear end portion of drive member 73 has a triangular nose 78 extending from the side thereof facing in the direction in which drive member 73 is urged by spring 76.

The return drive member 74 is pivoted on a pin 79 depending from the free end portion of main lever arm 65, and a toggle spring 80 (shown in broken lines on FIGS. 3A and 3B) acts on drive member 74 for alternatively urging the latter to an extended position (FIG. 3B) in which drive member 74 extends substantially outward from lever arm 65 so as to be engageable with pin 71, as hereinafter described, or to a retracted position (FIG. 3A) in which drive member 74 is substantially retracted in respect to the free end of main lever arm 65 so as to be withdrawn from the arcuate path of movement of pin 71 about the axis of shaft 25. As shown on FIGS. 2, 3A and 3B, chassis 29 is provided with a projection 81 engageable with return drive member 74 at the conclusion of the lead-in movement of main lever 36 for effecting positive movement of return drive member 74 to its extended position.

The lead-in lever 37 is disposed below chassis 29 and is shown to be pivotally mounted, at one end, on the same pivot pin 62 as main lever 36. Lead-in lever 37 is shown to extend in back of tone arm support shaft 25, and the free end portion of lever 37 is provided with a forwardly directed extension 37a which is engageable with pin 71 on member 67 for effecting the lead-in swinging movement of tone arm assembly 16 as hereinafter described in detail. A coupling pin 82 is directed upwardly from the free end portion of lead-in lever 37 through a suitable cutout 29a (FIG. 2) in chassis 29, and such coupling pin 82 is engageable by nose 78 of lead-in drive member 73 for causing lead-in lever 37 to follow the lead-in movement of main lever 36 to the extent that record size selecting mechanism 38 permits such movement of the lead-in lever. A portion 83 of chassis 29 which defines the back edge of cutout 29a acts as an abutment engageable by pin 82 for limiting the return swinging movement of lead-in lever 37.

The record size selecting mechanism 38 is shown to include a generally sector-shaped size selecting cam member 84 which is disposed below chassis 29 and pivoted on a pin 85 depending from the chassis. As shown particularly on FIG. 2, the record size selecting knob 21 is fixed to a shaft 86 which is journalled in upper panel 12 and which, at its lower end, has radial arm 87 extending therefrom. The outer end of arm 87 is pivotally connected to the forward end of an elongated link 88 which, at its rearward end, is pivotally connected, as at 89, to size selecting cam member 84 at a location on the latter spaced radially from the pivot 85 of the latter. Thus, turning of knob 21 is effective to cause corresponding turning or angular displacement of size-selecting cam member 84, and a suitable detent structure (not shown) is preferably provided for yieldably retaining cam member 84 in a selected one of a plurality of angularly displaced positions. The generally arcuate edge 84a of the sector-shaped size-selecting cam member 84 is formed with a plurality of edge portions which are at progressively increasing radial distances from pivot pin 85 for establishing the set-down positions for records having different diameters, for example, diameters of 17cm., 25cm. and 30cm. Further, an abutment 90 extends upwardly from a forwardly directed extension 37b (FIG. 3B) at the middle portion of lead-in lever 37 and is engageable with edge 84a of size-selecting cam member 84. It will be apparent that, by rotational adjustment of record size selecting knob 21, a selected portion of edge 84a of cam member 84 can be disposed for engagement by abutment 90, whereby to adjustably predetermine the extent to which lead-in lever 37 can swing with main lever 36 during the lead-in movement of the latter.

The above described control mechanism 33 operates as follows:

In the stop condition of control mechanism 33, the various components of such mechanism are all in the relative positions shown on FIG. 3A. Since vertically movable shaft 32 of arm lifter 31 rests on the horizontal surface of arm 65 of main lever 36, shaft 32 is at its raised position with the result that arm lifter 31 contacts, or is adjacent to the lower surface of tone arm 23 resting on arm rest 28.

Prior to initiating operation of control mechanism 33, record size selecting knob 21 is turned to the position thereof corresponding to the diameter of a record R which has been placed on turntable 14 so that a respective portion of edge 84a of record size selecting cam member 84 is disposed for eventual engagement by abutment 90 on lead-in lever 37.

When it is desired to effect a lead-in operation of control mechanism 33, motor 30 is operated so as to rotate turntable 14 with shaft 15 and electro-magnet 61 is momentarily energized, as hereinafter described in detail, for attracting the vertical portion 35c of actuating slide 35 and thereby displacing the latter to its operative position. In such operative position of slide 35, projection 35e of the latter acts against projection 46e of clutch 46 for displacing the latter to its engaged position shown in broken lines on FIG. 3A. In such engaged position of clutch 46, the free end of its arm 46a is interposed in the path of movement of nose or abutment 40a with drive gear 40. Accordingly, as nose 40a rotates in the direction of the arrow on FIG. 3A, it comes into engagement with the end of arm 46a and pushes the latter longitudinally for effecting an incremental rotation of control gear 41. Such incremental rotation of control gear 41 is sufficient to displace toothless gap 44a away from drive gear 40 and to cause meshing engagement of the latter with peripheral teeth 43a. Upon the engagement of teeth 43a with drive gear 40, control gear 41 is rotated through an angular displacement of 180°. During such angular displacement or lead-in movement of control gear 41, pin 60b depending therefrom moves against V-shaped projection 35e on slide 35 for returning the latter to its inoperative position. Further, during the lead-in movement or turning of control gear 41, the engagement of cam follower roller 64 in cam groove 45 effects angular displacement or lead-in movement of main lever 36 from the position shown on FIG. 3A to the position shown on FIG. 3B. During such lead-in movement of main lever 36, the triangular nose 78 on lead-in drive member 73 is moved against coupling pin 82 on lead-in lever 37 so that the latter is urged to move with main lever 36 in the direction of the lead-in movement of the latter. As lead-in lever 37 is moved with main lever 36, forwardly directed extension 37a of the lead-in lever engages pin 71 on sector-shaped member 67 for turning the latter in the clockwise direction about the axis of shaft 25. Such turning of sector-shaped member 67 is transmitted through set screw 70 and sector-shaped member 68 to shaft 25. Thus, so long as lead-in lever 37 is turned with main lever 36, tone arm support shaft 25 is turned in the direction to effect lead-in movement of tone arm 23, as indicated by the arrow i on FIG. 2. During such lead-in movement of tone arm 23, the latter slides on the elevated arm lifter 31 and thus is maintained in its raised position with the pickup stylus spaced from the record as it moves inwardly over the latter.

Upon completion of a predetermined lead-in movement of tone arm 23 established by the previous setting of record size selecting knob 21, abutment 90 on lead-in lever 37 engages the selected edge portion of record size selecting cam member 84 so as to prevent further movement of lead-in lever 37 with main lever 36. Thereafter, during further lead-in movement of main lever 36, the triangular nose 78 of lead-in drive member 73 cams across, and is separated from coupling pin 82 and the lead-in movement of main lever 36 can continue independently of lead-in lever 37. As main lever 36 arrives at its play position shown on FIG. 3B, return drive member 74 moves against abutment 81 and is displaced by the latter to its extended position. Further, as main lever 36 arrives at its play position, downwardly inclined ramp 66 of the main lever moves under shaft 32 so as to permit gravitationally induced downward movement of shaft 32 and of arm lifter 31 therewith so that tone arm 23 is lowered for engagement of the pickup stylus with the record R at the previously predetermined set-down position. Upon such engagement of the pickup stylus with record R, the lead-in operation of control mechanism 33 is completed and a play operation of the record player 10 is commenced.

At the completion of the lead-in movement of control gear 41, that is, at the start of a play operation of record player 10, the positions of clutches 46 and 47 are the reverse of the positions thereof in the stop condition of control mechanism 33, that is, downwardly directed projection 47e of clutch 47 is adjacent the projection 35e on actuating slide 35 (FIG. 3B). Further, at the commencement of the play operation, pin 72 is spaced from end 35f of actuating slide 35. However, during the play operation, the engagement of the pickup stylus in the spiral groove of record R causes the progressive inward swinging of the tone arm in the direction of the arrow i on FIG. 2, with the result that pin 72 moves progressively toward end 35f of actuating slide 35.

At the completion of a play operation of record player 10, that is, when the pickup stylus engages the inner non-recorded turn or turns of the spiral groove in record R, pin 72 on sector-shaped member 67 moves against the adjacent end 35f of slide 35 for displacing the latter to its operative position. As a result of such displacement of slide 35, projection 35e thereof acts against projection 47e of clutch 47 for displacing the latter to its engaged position. In such engaged position of clutch 47, the nose 40a rotating with drive gear 40 acts against the end of arm 47a so as to push the latter longitudinally and effect an incremental rotation of control gear 41. Such incremental rotation of gear 41 is sufficient to displace toothless gap 44b away from drive gear 44 and to cause meshing engagement of the latter with teeth 43b. Upon the engagement of teeth 43b with drive gear 40, control gear 41 is again turned through an angular displacement of 180° for effecting a return operation of control mechanism 33. During such half-revolution or return movement of control gear 41, pin 60a depending therefrom moves against V-shaped projection 35e on slide 35 for returning the latter to its inoperative position. Further, during the return movement of control gear 41, the engagement of cam follower roller 64 in cam groove 45 causes return swinging of movement of main lever 36 from the play position shown on FIG. 3B toward the stop position shown on FIG. 3A. At the commencement of such return movement of main lever 36, inclined ramp 66 thereof moves out from under arm lifter shaft 32 so that the latter is raised and thereafter supported on the horizontal portion of main lever arm 65, with the result that arm lifter 31 is raised for lifting tone arm 23 and separating the pickup stylus from record R during the return operation. As the return movement of main lever 36 is continued, return drive member 74, in its extended position, engages pin 71 on sector-shaped member 67 so as to turn the latter in the counter-clockwise direction about the axis of shaft 25 with the result that tone arm 23 is made to swing outwardly in the direction of the arrow i' on FIG. 2 while being held in its raised position on arm lifter 31.

During the return movement of main lever 36, nose 78 of drive member 73 acts against coupling pin 82 on lead-in lever 37 for similarly turning the lead-in lever. The several parts of control mechanism 33 are dimensioned and arranged so that the return swinging movement of tone arm 23 to its rest position on arm rest 28 is completed prior to the completion of the return movement of control gear 41 to its stop position. When tone arm 23 is returned to its rest position on arm rest 28, pin 82 on lead-in lever 37 engages abutment 83 so as to prevent further return swinging movement of lead-in lever 37. Therefore, during the final return movement of control gear 41 to its stop position, nose 78 of drive member 73 cams over coupling pin 82 so as to be again engaged in back of the latter, as shown on FIG. 3A. Further, during the final return movements of control gear 41 and main lever 36 to their respective stop positions, additional turning of sector-shaped member 67 is blocked by the engagement of tone arm 23 with arm rest 28 and, therefore, movement of pin 71 by return drive member 74 is arrested. Accordingly, during the final return movement of main lever 36, pin 71 reacts against drive member 74 for displacing the latter from its extended position to its retracted position shown on FIG. 3A. It will also be seen that, during the final return movement of control gear 41 back to its stop position shown on FIG. 3A, clutch 46, which had been in its engaged position since initiation of the previously described lead-in operation, is returned to its disengaged position by the movement of its projecting cam portion 46d across the periphery of drive gear 40. Accordingly, when control gear 41 returns to its original or stop position in which toothless gap 44a faces toward drive gear 40, nose or abutment 40a can rotate with drive gear 40 without engaging arm 46a of clutch 46.

It will be seen from the foregoing that, following the momentary energizing of electro-magnet 61 for initiating the lead-in operation of control mechanism 33, such control mechanism provides an automatic operating cycle of record player 10 in which the lead-in operation for moving tone arm 23 from its elevated rest position outside the perimeter of turntable 14 to a set-down position on record R supported by the turntable is followed, in turn, by a play operation in which the pickup stylus engages the record at the set-down position and thereafter tracks the record groove for reproducing the sound recorded therein, and by a return operation initiated upon completion of the play operation and in which the tone arm 23 is returned to its rest position. In the event that the user of record player 10 desired to abort such automatic operating cycle, that is, to prevent the play operation or to interrupt the play operation before the completion thereof, it is only necessary to momentarily energize electro-magnet 61 with control gear 41 in its play position (FIGS. 3B and 5C). Such momentary energizing of electro-magnet 61 is effective to displace actuating slide 35 to its operative position so that, as in the above described return operation at the completion of a play operation, clutch 47 is moved to its engaged position to cooperate with nose 40a for initiating the return movement of control gear 41. Thereafter, during the return movement of control gear 41, the other components of control mechanism 33 operate as previously described for returning tone arm 23 to its rest position. Although the momentary energizing of electromagnet 61 for aborting the automatic operating cycle has to occur with control gear 41 in its play position, that is, in the position occupied by control gear 41 at the completion of the lead-in operation and during the following play operation, the user of record player 10 may decide to abort the automatic operating cycle and wish to reject the playing of the record then disposed on turntable 14 immediately following the initiation of the lead-in operation, that is, before the tone arm 23 has been moved inwardly to the predetermined setdown position on the record.

Therefore, in accordance with this invention, the record player 10 having a normal automatic operating cycle, as aforesaid, is provided with a control circuit which permits the user to actuate a switch or other manually actuable device for generating or producing a stop command signal at any stage of the automatic operating cycle, and particularly during the lead-in operation thereof, so as to effect a return operation for aborting the automatic operating cycle either immediately upon the generation of the stop command signal, if the latter is generated during a play operation, or, in the event that the stop command signal is generated during the lead-in operation, immediately upon completion of such lead-in operation. Generally, in a control circuit provided in accordance with this invention, a stop command signal for aborting the automatic operating cycle is temporarily retained in a respective memory which provides a corresponding memory output, the completion of the lead-in operation is detected by a sensor to provide a corresponding sensor output and, upon coincidence of the sensor output corresponding to completion of the lead-in operation with the memory output corresponding to a retained stop command signal, an AND circuit provides an output for energizing the electro-magnet 61 and thereby initiating the return operation of control mechanism 33.

Figure 6:
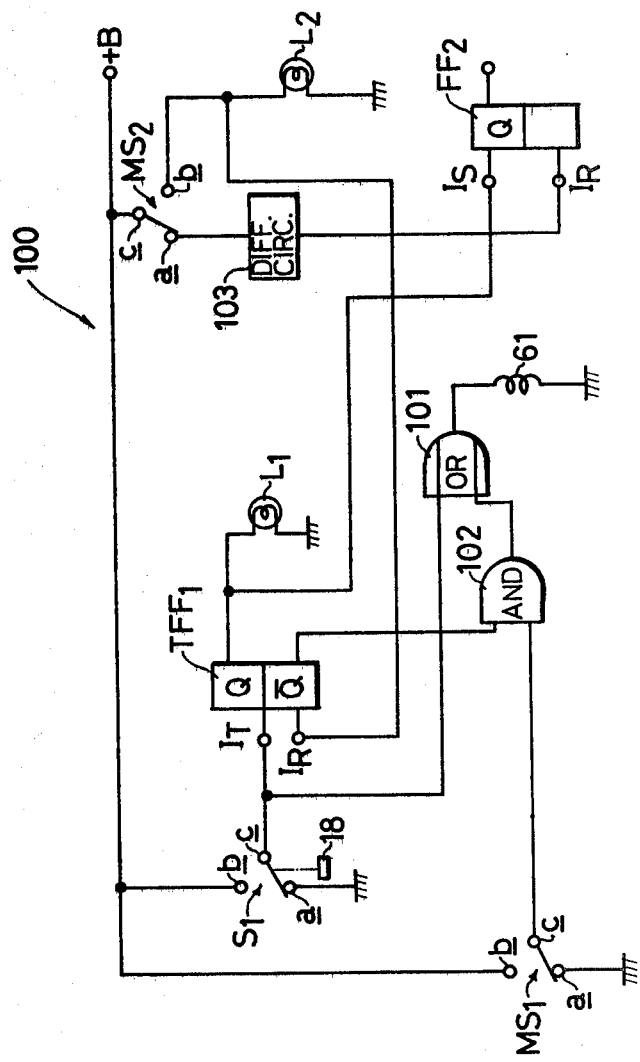
FIG. 6 is a circuit diagram of a control circuit for controlling the operation of the record player of FIGS. 1-4 in accordance with one embodiment of this invention.

Referring now to FIG. 6, it will be seen that, in a control circuit 100 according to this invention for use with the above described phonograph record player 10, the start/stop switch actuator 18 may actuate a switch $S_1$ having fixed contacts $a$ and $b$ respectively connected to ground and to a voltage source +B, and a movable contact $c$ normally engaging the fixed contact $a$ and being changed-over to engage fixed contact $b$ each time the user touches or applies a light pressure to the associated switch actuator 18. The movable contact $c$ of switch $S_1$ is connected to one input of an OR circuit 101 which has its output connected to electro-magnet 61. Further, the movable contact $c$ of switch $S_1$ is connected to a trigger input $I_T$ of a toggle flip-flop $TFF_1$ which is changed-over between first and second alternative states in response to successive electrical command pulses applied to input $I_T$ in response to successive actuations of switch $S_1$. The toggle flip-flop $TFF_1$ provides a memory for temporarily retaining a stop command signal, as hereinafter described in detail, and has two outputs Q and $\bar{Q}$ which, in the first state of the toggle flip-flop, are respectively "1" and "0", and which are changed-over to "0" and "1", respectively, in the second state of toggle flip-flop $TFF_1$. The output Q of toggle flip-flop $TFF_1$ is applied to an indicator or lamp $L_1$ which, as shown on FIG. 1, may be mounted on the start/stop switch actuator 18. The output Q of toggle flip-flop $TFF_1$ is further connected to a set input terminal $I_S$ of a flip-flop $FF_2$ having an output Q which, in the set state of flip-flop $FF_2$, is "1" to cause operation of the motor 30 for driving shaft 15 and turntable 14, whereas the output Q of flip-flop $FF_2$ is changed-over to "0" in the reset state of such flip-flop for halting the operation of motor 30.

The inverted output $\bar{Q}$ of toggle flip-flop $TFF_1$ is applied to one input of an AND circuit 102 which has its output connected to a second input of OR circuit 101, and another input of AND circuit 102 receives an output from a sensor when the latter detects completion of a lead-in operation of control mechanism 33. As shown, such sensor may be constituted by a microswitch $MS_1$ having fixed contacts $a$ and $b$ respectively connected to ground and to voltage source +B and a movable contact $c$ connected to the respective input of AND circuit 102 and being normally engaged with fixed contact $a$. The movable contact $c$ of microswitch $MS_1$ is changed-over to engage the fixed contact $b$ and thereby provide the sensor output only at the completion of the lead-in operation. For example, as shown on FIGS. 3A and 3B, the microswitch $MS_1$ may be made to detect completion of the lead-in operation of mechanism 33 by being suitably fixedly mounted under main lever 36 which has a switch actuating pin 91 depending therefrom for actuating microswitch $MS_1$ and thereby engaging movable contact $c$ of the latter with the respective fixed contact $b$ only when main lever 36 is in its play position (FIG. 3B) at the completion of the lead-in movement of the main lever.

Referring again to FIG. 6, it will be seen that the control circuit 100 according to this invention, as there illustrated, further includes a microswitch $MS_2$ having fixed contacts $a$ and $b$ and a movable contact $c$ which normally engages fixed contact $a$ in the stop and play conditions and during the lead-in operation of control mechanism 33, and which is changed-over to engage fixed contact $b$ only during the return operation of control mechanism 33. The movable contact $c$ of microswitch $MS_2$ is connected to voltage source +B, and the fixed contact $a$ of microswitch $MS_2$ is shown to be connected to a differential circuit 103 having its output connected to a reset input terminal $I_R$ of the motor-control flip-flop $FF_2$. It will be apparent that the differential circuit 103 provides an output or pulse for resetting flip-flop $FF_2$ and thereby halting operation of motor 30 only when movable contact $c$ of microswitch $MS_2$ is changed-over from engagement with the respective fixed contact $b$ to its normal engagement with fixed contact $a$ at the completion of a return operation. Therefore, microswitch $MS_2$ and differential circuit 103 combine to form a sensor for detecting completion of the return operation. The fixed contact $b$ of microswitch $MS_2$ is connected to a lamp or indicator $L_2$ which is illuminated only during a return operation of control mechanism 33 and which, as shown on FIG. 1, may be mounted on the front panel of cabinet 11 between start/stop switch actuator 18 and power ON-OFF switch actuator 20. The fixed contact $b$ of microswitch $MS_2$ is further shown on FIG. 6 to be connected to a reset input terminal $I_R$ of toggle flip-flop $TFF_1$ so that the latter is retained in its second state in which output Q is "0" and inverted output $\bar{Q}$ is "1" throughout the return operation of control mechanism 33 and cannot be changed-over to its first state by actuation of switch $S_1$ during such return operation.

As shown on FIGS. 3A and 3B, microswitch $MS_2$ may be suitably mounted adjacent control gear 41 so as to be actuable by a radial cam 92 formed on the circumference of control gear 41 below peripheral teeth 43a, 43b (FIG. 4). As shown, radial cam 92 has a radially enlarged portion engaged by microswitch $MS_2$ in the stop and play positions of control gear 41 (FIGS. 3A and 3B) and during the lead-in movement of control gear 41 for causing engagement of movable contact $c$ of microswitch $MS_2$ with its fixed contact $a$, while the remainder or radially reduced portion of cam 92 is engaged by microswitch $MS_2$ only during the return movement of control gear 41 for causing engagement of movable contact $c$ of microswitch $MS_2$ with fixed contact $b$.

The above described control circuit 100 according to this invention operates as follows:

Assuming that record player 10 is initially in its stop condition, in which case, control mechanism 33 is disposed as shown on FIG. 3A and switches $S_1$, $MS_1$ and $MS_2$ are disposed as shown on FIG. 6 with flip-flops $TFF_1$ and $FF_2$ in their reset or second states, the touching of start/stop switch actuator 18 will cause switch $S_1$ to produce a start command signal $P_1$ (FIG. 7A) which is transmitted through OR circuit 101 to electromagnet 61 for causing momentary energizing of the latter (FIG. 7B) and thereby initiating a lead-in operation of control mechanism 33, as previously described. The start command signal or pulse $P_1$ is further applied to trigger input terminal $I_T$ of toggle flip-flop $TFF_1$ so as to establish the first or set state of the latter in which output Q is "1". Such output Q of the toggle flip-flop is applied to lamp $L_1$ for illuminating the latter (FIG. 7C) and thereby indicating that the record player is performing a lead-in operation and, subsequently, a play operation. Further, when the output Q of toggle flip-flop $TFF_1$ becomes "1", as aforesaid, such output applied to the set terminal $I_S$ of flip-flop $FF_2$ is effective to set the latter so that its output Q becomes "1" (FIG. 7E) for causing operation of motor 30. Thus, the lead-in operation of control mechanism 33 proceeds as previously described for effecting lead-in movement of tone arm 23 to a predetermined set-down position on the phonograph record. At the completion of the lead-in operation, micro-switch $MS_1$ detects the same and provides an output to AND circuit 102 (FIG. 7D). However, in the nromal or automatic operating cycle of record player 10, toggle flip-flop $TFF_1$ is in its first state at the completion of the lead-in operation so that its inverted output $\overline{Q}$ applied to AND circuit 102 is "0" and no output issues therefrom for energizing electromagnet 61. Thus, the play operation follows the lead-in operation and, during such lead-in and play operations, the movable contact $c$ of microswitch $MS_2$ continues to engage its fixed contact $a$ (FIG. 7F) so that lamp $L_2$ remains deenergized.

Upon completion of the play operation, actuating slide 35 is mechanically displaced to its operative position, as previously described and as indicated at FIG. 10B, for initiating a return operation of control mechanism 33. Upon the commencement of the return movement of main lever 36, actuating pin 91 moves away from microswitch $MS_1$ so that movable contact $c$ of the latter is returned to engagement with the respective fixed contact $a$ (FIG. 10D). Further, upon the commencement of the return movement of control gear 41, cam 92 causes change-over of microswitch $MS_2$ so that the movable contact $c$ of the latter engages the respective fixed contact $b$ (FIG. 10E). As a result of the foregoing, lamp $L_2$ is illuminated (FIG. 10F) to indicate the occurrence of the return operation, and toggle flip-flop $TFF_1$ is changed-over to, and retained in its second state in which its outputs Q and $\overline{Q}$ are respectively "0" and "1". Thus, lamp $L_1$ is extinguished at the commencement of the return operation (FIG. 10C). Further, by reason of the voltage being applied to the reset input terminal $I_R$ of toggle flip-flop $TFF_1$ through microswitch $MS_2$, the accidental or other touching of switch actuator 18 during the return operation and a resulting command signal applied from switch $S_1$ to trigger input terminal $I_T$ of the toggle flip-flop, for example, as indicated at $P'_1$ on FIG. 10A, is ineffective to trigger or return toggle flip-flop $TFF_1$ to its first state. Finally, at the completion of the return operation, that is, when control gear 41 returns to its stop position (FIG. 3A), movable contact $c$ of microswitch $MS_2$ is again engaged with the respective fixed contact $a$ (FIG. 10E) and, as a result thereof, differential circuit 103 provides an output to the reset input terminal $I_R$ of flip-flop $FF_2$ for resetting the latter and thereby halting operation of motor 30 (FIG. 10G). At the completion of the return operation, lamp $L_2$ is extinguished and the normal automatic operating cycle of the record player is concluded.

If the user desires to abort the automatic operating cycle of record player 10 during the play operation of the latter, that is, after the lead-in operation and at a time when control mechanism 33 is already in the play condition thereof shown on FIG. 3B and the toggle flip-flop $TFF_1$ is in its previously described first state with the outputs Q and $\overline{Q}$ being "1" and "0", respectively, and with flip-flop $FF_2$ being in its set state for operating motor 30, it is only necessary for the user to touch start/stop switch actuator 18 for changing over movable contact $c$ of switch $S_1$ from engagement with the respective fixed contact $a$ to engagement with the fixed contact $b$ so as to apply a stop command signal $P_2$ (FIG. 9A) to trigger input terminal $I_T$ of toggle flip-flop $TFF_1$. In response to such stop command signal $P_2$, toggle flip-flop $TFF_1$ is changed over to its second state in which output Q thereof becomes "0" to extinguish lamp $L_1$ (FIG. 9C). Further, the stop command signal $P_2$ is applied through OR circuit 101 to electromagnet 61 for energizing the latter and thereby moving actuating slide 35 to its operative position (FIG. 9B). Since control gear 41 is in its play position when stop command signal $P_2$ is generated and energizes electromagnet 61, the resulting movement of slide 35 to its operative position is effective to engage clutch 47 so as to initiate the return operation of control mechanism 33. Thereafter, the return operation proceeds in the same manner as described above in connection with the normal automatic operating cycle. In other words, upon the commencement of the return movement of main lever 36, actuating pin 91 moves away from microswitch $MS_1$ so that movable contact $c$ of the latter is returned to engagement with the respective fixed contact $a$ (FIG. 9D). Further, upon the commencement of the return movement of control gear 41, cam 92 causes change-over of microswitch $MS_2$ so that the movable contact $c$ of the latter engages the respective fixed contact $b$ (FIG. 9E). As a result of the foregoing, lamp $L_2$ is illuminated (FIG. 9F) to indicate the occurrence of the return operation, while toggle flip-flop $TFF_1$ has voltage applied to its reset input terminal $I_R$ for retaining such flip-flop in its second state throughout the return operation. Thus, even if switch actuator 18 is accidentally touched during the return operation, the resulting command signal applied from switch $S_1$ to trigger input terminal $I_T$ of the toggle flip-flop, for example, as indicated at $P'_1$ on FIG. 9A, is ineffective to trigger toggle flip-flop $TFF_1$ from its second state back to its first state. Finally, at the completion of the return operation, that is, when control gear 41 returns to its stop position (FIG. 3A), movable contact $c$ of microswitch $MS_2$ is again engaged with the respective fixed contact $a$ (FIG. 9E) and, as a result thereof, differential circuit 103 provides an output to the reset input terminal $I_R$ of flip-flop $FF_2$ for resetting the latter and thereby halting operation of motor 30 (FIG. 9G). Further, upon the reengagement of movable contact $c$ of microswitch $MS_2$ with the respective fixed contact $a$, lamp $L_2$ is extinguished for indicating the completion of the return operation and the restoration of control mechanism 33 to its stop condition.

If the user of record player 10 decides to abort the normal automatic operating cycle immediately following the initiation thereof, for example, at a time T following the generation of the start command signal $P_1$ which is within the time required for the lead-in operation, the user merely touches start/stop switch actuator 18 so as to cause the associated switch $S_1$ to provide the stop command pulse or signal $P'_2$ (FIG. 8A). Since such stop command pulse $P'_2$ occurs during the lead-in operation, that is, at a time prior to the arrival of control gear 41 at its play position (FIG. 3B), the energizing of electromagnet 61 by the stop command signal $P'_2$ transmitted thereto through OR circuit 101 and the resulting movement of actuating slide 35 to its operative position is ineffective to displace clutch 47 to its engaged position for initiating the return operation. However, the stop command signal $P'_2$, when applied to trigger input terminal $I_T$ of toggle flip-flop $TFF_1$, is effective immediately to change-over the toggle flip-flop to its second state in which its outputs Q and $\bar{Q}$ are "0" and "1", respectively, so as to provide a memory output corresponding to retention of the stop command signal. Immediately upon the change-over of toggle flip-flop $TFF_1$ to its second state for memorizing or retaining the stop command signal $P'_2$ generated during the lead-in operation, lamp $L_1$ is extinguished (FIG. 8C) for indicating that the lead-in operation then in process will not be followed by a normal play operation. When microswitch $MS_1$ is changed-over by actuating pin 91 at the completion of the lead-in operation so as to engage movable contact $c$ of microswitch $MS_1$ with the respective fixed contact $b$, the resulting sensor output from such microswitch (FIG. 8D) is applied to AND circuit 102 simultaneously with the output Q = "1" from toggle flip-flop $TFF_1$. Therefore, at the completion of the lead-in operation, an output of pulse issues from AND circuit 102 and is passed through OR circuit 101 for energizing electromagnet 61 (FIG. 8B) and thereby moving actuating slide 35 to its operative position. Upon such movement of slide 35 to its operative position, control gear 41 is at its play position (FIG. 3B) so that clutch 47 is engaged by slide 35 for initiating the return operation. Such return operation proceeds in the manner previously described in connection with the automatic operating cycle of record player 10, that is, microswitch $MS_2$ is changed-over to indicate the occurrence of the return operation (FIG. 8F) and, at the completion of the return operation, microswitch $MS_2$ is restored to its original condition with the result that differential circuit 103 provides a pulse to reset flip-flop $FF_2$ and thereby halt the operation of motor 30 (FIG. 8E).

It will be apparent from the above that the control circuit 100 of FIG. 6 permits the user merely by actuation of switch $S_1$ to initiate an automatic operating cycle consisting of a lead-in operation, a play operation and a return operation in succession, or to abort such automatic operating cycle by a further actuation of switch $S_1$ either during the lead-in or play operation so as to eliminate the play operation or cut short the latter, respectively. In either case, the operation of the record player 10 is terminated upon the completion of the return operation, at which time tone arm 23 is returned to its rest position on arm rest 28 and the operation of motor 30 for driving turntable 14 is halted.

Figure 11:
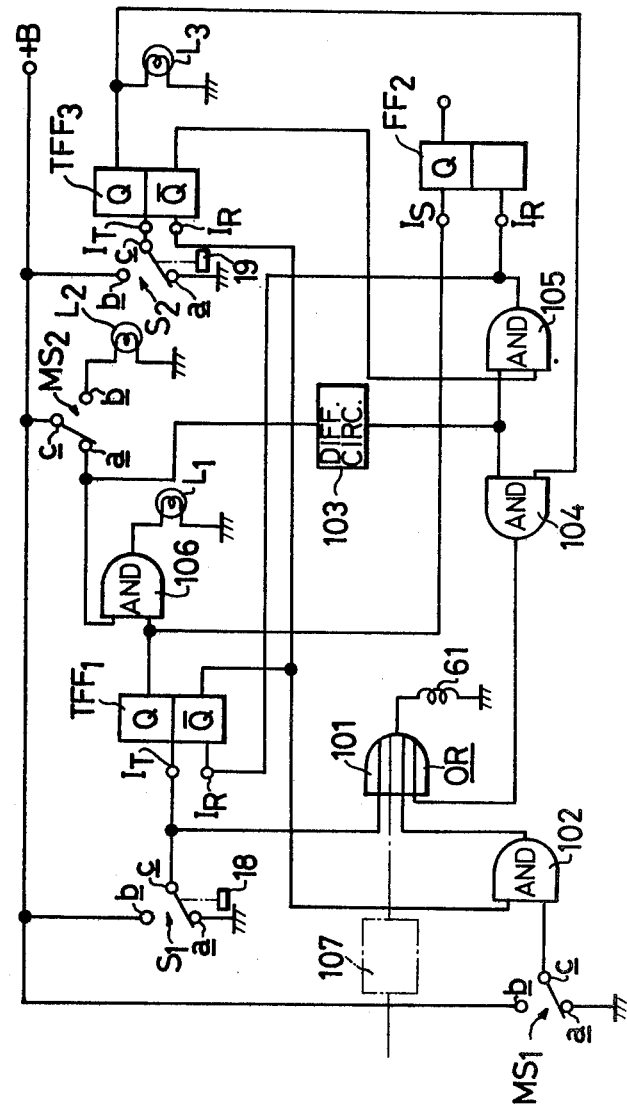
FIG. 11 is a circuit diagram showing a control circuit for controlling the operations of the record player of FIGS. 1-4 in accordance with another embodiment of this invention.

However, as shown on FIG. 11, the record player 10 having a normal automatic operating cycle, as aforesaid, may be provided with a control circuit 200 according to this invention which permits the user to actuate a switch or other manually actuable device for generating or producing a repeat command signal at any stage of the automatic operating cycle so as to effect successive repetitions of the automatic operating cycle. Generally, in such a control circuit according to this invention, a repeat command signal generated at any stage of the automatic operating cycle is temporarily retained in a respective memory which provides a corresponding memory output, the completion of a return operation is detected by a sensor to provide a corresponding sensor output and, upon coincidence of the sensor output corresponding to completion of the return operation with the memory output corresponding to a retained repeat command signal, an AND circuit provides an output for energizing the electro-magnet 61 and thereby initiating a lead-in operation of the control mechanism 33.

Referring in detail to FIG. 11 in which the various components of control circuit 200 corresponding to those included in the control circuit 100 of FIG. 6 are identified by the same reference numerals, it will be seen that the control circuit 200 further includes a switch $S_2$ actuated by the repeat/repeat-halt switch actuator 19 and having fixed contacts $a$ and $b$ respectively connected to ground and to the voltage source +B, and a movable contact $c$ normally engaging the respective fixed contact $a$ and being changed-over to engage fixed contact $b$ each time the user touches or applies a light pressure to the associated switch actuator 19. The movable contact $c$ of switch $S_2$ is connected to a trigger input $I_T$ of a toggle flip-flop $TFF_3$ which is changed-over between first and second alternative states in response to successive electrical command pulses applied to input $I_T$ by successive actuations of switch $S_2$. The toggle flip-flop $TFF_3$ provides a memory for temporarily retaining a repeat command signal, when in its first state, or a repeat-halt command signal, when in its second state. The toggle flip-flop $TFF_3$ has two outputs Q and $\bar{Q}$ which, in the first state corresponding to retention of a repeat command signal, are respectively "1" and "0", and which are changed-over to "0" and "1", respectively, in the second state of toggle flip-flop $TFF_3$ corresponding to a retained repeat-halt command signal. The output Q of toggle flip-flop $FF_3$ is applied to an indicator or lamp $L_3$ which, as shown on FIG. 1, may be mounted on the repeat/repeat-halt switch actuator 19. The output Q of toggle flip-flop $TFF_3$ is further connected to an input of an AND circuit 104 which, at another input thereof, receives the output of differential circuit 103 and has its output connected to OR circuit 101. The output $\bar{Q}$ of toggle flip-flop $TFF_3$ is connected to an input of an AND circuit 105 which, at another input thereof, receives the output of differential circuit 103, and which has its output connected to the reset input terminal $I_R$ of the motor-controlling flip-flop $FF_2$. The output of AND circuit 105 is further shown to be connected to the reset input terminal $I_R$ of toggle flip-flop $TFF_1$. Further, as shown, the output $\bar{Q}$ of toggle flip-flop $TFF_1$ is connected to a reset input terminal $I_R$ of toggle flip-flop $TFF_3$, as well as to an input of AND circuit 102 as in the previously described control circuit 100. Finally, in the circuit 200, the lamp or indicator $L_1$ is not directly energized by the output Q of toggle flip-flop $TFF_1$, as in the control circuit 100, but rather is energized by the output of an AND circuit 106 which has its inputs respectively connected to the output Q of toggle flip-flop $TFF_1$ and to the fixed contact $a$ of microswitch $MS_2$.

The above described control circuit 200 according to this invention operates as follows:

Assuming that record player 10 is initially in its stop condition, in which case control mechanism 33 is disposed as shown in FIG. 3A and switches $S_1$, $S_2$, $MS_1$ and $MS_2$ are disposed as shown on FIG. 11 with flip-flops $TFF_1$, $FF_2$ and $TFF_3$ in their reset or second states, that is, with the outputs Q of all three flip-flops being "0" and the outputs $\overline{Q}$ of toggle flip-flops $TFF_1$ and $TFF_3$ being "1", the touching of start/stop switch actuator 18 will cause switch $S_1$ to produce a start command signal which is transmitted through OR circuit 101 to electromagnet 61 for causing momentary energizing of the latter and thereby initiating a lead-in operation of control mechanism 33 as previously described. The start command signal is further applied to trigger input terminal $I_T$ of toggle flip-flop $TFF_1$ so as to establish the first state of the latter in which its output Q is "1". Such output Q of toggle flip-flop $TFF_1$ is applied to the set input terminal $I_S$ of flip-flop $FF_2$ so that the latter is set or changed-over to its first state in which output Q thereof becomes "1" for causing operation of motor 30. Further, since the movable contact $c$ of microswitch $MS_2$ engages the respective fixed contact $a$ for applying a voltage to the respective input of AND circuit 106, the change-over of toggle flip-flop $TFF_1$ for causing its output Q to become "1" causes illumination of lamp $L_1$. At the completion of the lead-in operation, microswitch $MS_1$ detects the same and provides an output to AND circuit 102, however, since output Q of toggle flip-flop $TFF_1$ is "0" at the completion of the lead-in operation in the normal or automatic operating cycle of record player 10, no output is derived from AND circuit 102. Thus, the play operation follows the lead-in operation and lamp $L_1$ remains energized while lamp $L_2$ remains deenergized.

Upon completion of the play operation, actuating slide 35 is mechanically displaced to its operative position, as previously described, for initiating a return operation of control mechanism 33. Alternatively, an end detecting circuit 107 may be provided, as indicated in broken lines on FIG. 11, for electro-magnetically or photo-electrically detecting the end or completion of the play operation and providing a corresponding sensor output which is applied through OR circuit 101 to electro-magnet 61 so as to thereby displace slide 35 to its operative position for initiating the return operation. Upon commencement of the return operation, movable contact $c$ of microswitch $MS_1$ is returned to engagement with the respective fixed contact $a$, and microswitch $MS_2$ is changed-over so that its movable contact $c$ engages the respective fixed contact $b$. As a result of the foregoing, lamp $L_2$ is illuminated to indicate the occurrence of return operation and lamp $L_1$ is extinguished even though toggle flip-flop $TFF_1$ remains in its first state with output Q thereof being "1". Finally, at the completion of the return operation, movable contact $c$ of microswitch $MS_2$ is again engaged with the respective fixed contact $a$ and, as a result thereof, lamp $L_2$ is extinguished and differential circuit 103 provides an output to the respective input of AND circuit 105. It will be noted that, at the completion of the return operation in the normal automatic operating cycle of the record player, the output $\overline{Q}$ of toggle flip-flop $TFF_3$ is "1" so that, in response to the output from differential circuit 103, AND circuit 105 provides an output to the reset input terminals $I_R$ of toggle flip-flop $TFF_1$ and flip-flop $FF_2$. Therefore, upon the completion of the return operation in the normal automatic operating cycle, flip-flop $FF_2$ is reset or returned to its second state in which output Q thereof is "0" to halt operation of motor 30, and toggle flip-flop $TFF_1$ is also returned to its second state in which its outputs Q and $\overline{Q}$ are respectively "0" and "1".

The control circuit 200 of FIG. 11 is operative similarly to the previously described control circuit 100 of FIG. 6 for aborting the automatic operating cycle of record player 10 in response to touching of start/stop switch actuator 18 either during the play operation or during the lead-in operation that precedes the play operation. Thus, as previously described, the stop command signal issuing from switch $SW_1$ in response to touching of switch actuator 18 during the play operation is applied through OR circuit 101 to electromagnet 61 for causing movement of acutating slide 35 to its operative position and thereby immediately initiating the return operation. Such stop command signal further causes change-over of toggle flip-flop $TFF_1$ to its second state in which the respective output Q becomes "0" to extinguish lamp $L_1$. If the stop command signal is made to issue from switch $S_1$ during a lead-in operation, the energizing of electromagnet 61 and the consequent movement of actuating slide 35 to its operative position cannot immediately initiate a return operation, as return clutch 47 is not then disposed for engagement by actuating slide 35. However, the stop command signal generated during the lead-in operation causes change-over of toggle flip-flop $TFF_1$ to its second state in which outputs Q and $\overline{Q}$ thereof are respectively "0" and "1" for immediately extinguishing lamp $L_1$ and for applying a voltage to the respective input of AND circuit 102. Thus, the stop command signal is memorized or retained and, at the completion of the lead-in operation when microswitch $MS_1$ is changed-over to apply voltage to the respective input of AND circuit 102, an output is derived from the latter and is transmitted through OR circuit 101 for energizing electro-magnet 61 and causing initiation of the return operation. In either case, that is, whether the stop command signal is generated during the play operation so as to immediately initiate the return operation or the stop command signal is generated during the lead-in operation so as to initiate the return operation upon completion of such lead-in operation, the return operation proceeds as previously described and circuit 200 is restored to its original or stop condition at the completion of the return operation.

Control circuit 200 differs substantially from the previously described control circuit 100 in that successive actuations of switch $S_2$ in response to touching of switch actuator 19 are effective to cause repetition of the automatic operating cycle of record player 10, and to halt such repetition of the automatic operating cycle. More particularly, with toggle flip-flop $TFF_3$ being initially in its second state so that the outputs Q and $\overline{Q}$ thereof are respectively "0" and "1", touching of switch actuator 19 for engaging the movable contact $c$ of switch $S_2$ with the respective fixed contact $b$ causes a repeat command pulse or signal to be applied from switch S₂ to the trigger input terminal I_T of toggle flip-flop TFF₃ for changing-over the latter to its first state provided that the record player is not then in its stop condition in which case the output $\overline{Q}$ of toggle flip-flop TFF₁ applied to reset input terminal I_R od toggle flip-flop TFF₃ is "1" to hold toggle flip-flop TFF₃ in its second state. In other words, the touching of switch actuator 19 for actuating switch S₂ at any time during a lead-in operation, a play operation or a return operation is effective to change-over toggle flip-flop TFF₃ to its first state in which the outputs Q and $\overline{Q}$ are respectively "1" and "0". In response to such change-over of toggle flip-flop TFF₃ to its first state, lamp L₃ is immediately illuminated to indicate that the repeat mode of operation of the record player has been selected. Further, the repeat command signal is memorized or retained by toggle flip-flop TFF₃ in that the output $\overline{Q}$ of toggle flip-flop TFF₃ as applied to the respective input of AND circuit 105 remains "0". Therefore, at the completion of the return operation of the automatic operating cycle during which the repeat command signal is generated, and thereafter at the completion of any successive automatic operating cycles for so long as toggle flip-flop TFF₃ remains in its first state, the output from differential circuit 103 occurring at the completion of each return operation is blocked at AND circuit 105 so that no output is applied from the latter to reset input terminals I_R of toggle flip-flop TFF₁ and flip-flop FF₂ which, therefore, remain in their first states. Accordingly, flip-flop FF₂ continues the operation of motor 30 at the completion of the return operation. Further, so long as toggle flip-flop TFF₃ remains in its first state to retain or memorize the repeat command signal, the output Q thereof as applied to AND circuit 104 remains "1" so that, upon completion of each return operation, the resulting output from differential circuit 103 causes AND circuit 104 to provide an output which is passed through OR circuit 101 for energizing electromagnet 61 with the result that actuating slide 35 is moved to its operative position for causing engagement of clutch 46 and thereby initiating a lead-in operation immediately following the completion of the return operation in the preceding automatic operating cycle. Accordingly, so long as toggle flip-flop TFF₃ memorizes or retains the repeat command signal, the automatic operating cycle is repeated, that is, repetitive playing of a record R on turntable 14 is achieved, with lamp L₃ being continuously illuminated to show that the repeat mode of operation has been selected and with lamps L₁ and L₂ being respectively illuminated during the lead-in and play operations and during the return operation of the successive automatic operating cycles.

After the repeat mode of operation has been established, as described above, and at any time during any one of the successive automatic operating cycles, switch actuator 19 may be touched again to actuate switch S₂ and thereby generate a repeat-halt command signal which, when applied to trigger input terminal I_T of toggle flip-flop TFF₃ returns the latter to its second state for memorizing such repeat-halt command signal and in which outputs Q and $\overline{Q}$ thereof are respectively "0" and "1". As a result of the foregoing, lamp L₃ is immediately extinguished for indicating that the repeat mode of operation is no longer selected and the outputs Q and $\overline{Q}$, as applied to the respective inputs of AND circuits 104 and 105 are respectively "0" and "1". Therefore, at the end of the automatic operating cycle during which the repeat-halt command signal is generated, the output of differential circuit 103 produced in response to completion of the respective return operation is blocked at AND circuit 104 to avoid energizing of electro-magnet 61 thereby, but such output of differential circuit 103 passes through AND circuit 105 to reset input terminals I_R of toggle flip-flop TFF₁ and flip-flop FF₂ so that such flip-flops are restored to their second states with flip-flop FF₂ halting the operation of motor 30.

It will also be noted that, after the repeat mode of operation has been selected, as described above, and at any time during the resulting successive automatic operating cycles of the record player, switch actuator 18 may be touched to actuate the associated switch S₁ for producing a stop command signal which changes-over toggle flip-flop TFF₁ to its second state for memorizing the stop command signal and causing the outputs Q and $\overline{Q}$ of toggle flip-flop TFF₁ to become "0" and "1", respectively. Such output $\overline{Q}$ of toggle flip-flop TFF₁ is applied to reset input terminal I_R of toggle flip-flop TFF₃ for changing-over the latter to its second state and thereby erasing the memorized repeat command signal fron toggle flip-flop TFF₃. Further, if the stop command signal is generated during a play operation, the resulting energizing of electromagnet 61 causes the immediate initiation of a return operation and, at the completion thereof, the output of differential circuit 103 is passed through AND circuit 105 for resetting flip-flop FF₂ to its second state and thereby halting operation of motor 30. On the other hand, if the stop command signal is generated during a lead-in operation, the initiation of the return operation is delayed until the completion of the lead-in operation as detected by microswitch MS₁.

It will be apparent from the above that, with the control circuit 200 being in its repeat mode of operation, the generation of a repeat-halt command signal permits the automatic operating cycle to proceed to its conclusion, whereas, the generation of a stop command signal is effective to abort the automatic operating cycle then in process.

Referring now to FIGS. 12–15, it will be seen that, in another embodiment of this invention, the various operations of control mechanism 33 are detected by a sensor arrangement that includes microswitches MS₃ and MS₄ that are suitably mounted one above the other at fixed locations adjacent a modified control gear 41' which is similar to the previous control gear 41, but is formed, on its circumference below peripheral teeth 43a and 43b, with radial cams 108 and 109 for controlling microswitches MS₃ and MS₄, respectively. As shown particularly on FIG. 14, radial cam 108 has a radially cut-in or reduced portion 108a with an angular extent of about 180° and a radially enlarged portion 108b also having an angular extent of about 180°. On the other hand, as shown in FIG. 15, radial cam 109 has diametrically opposed radially cut-in or reduced portions 109a and 109b each having an angular extent equal approximately to the angular extent θ₀ of the toothless gaps 44a and 44b of control gear 41', and radially enlarged portions 109c and 109d extending between the radially reduced portions 109a and 109b. If the microswitches MS₃ and MS₄ are both disposed to engage the respective cams 108 and 109 at points on the latter that are spaced by an arbitrary angle θ₃ from the diametrical line A—A bisecting the toothless gaps 44a and 44b in the stop position of control gear 41', then radially reduced cam portion 108a may extend angularly from $(\theta_3 - \theta_0/2)$ to $[\theta_1 + \theta_0 + (\theta_3 - \theta_0/2)]$, measured from the line A—A, as shown on FIG. 14. On the other hand, when similarly measured and as shown on FIG. 15, radially reduced cam portions 109a and 109b may extend respectively from $[\theta_3 + \theta_1 + \theta_0/2]$ to $[\theta_3 + 0_1 + \theta_0 + \theta_0/2]$ and from $(\theta_3 - \theta_0/2)$ to $(\theta_3 + \theta_0/2)$.

If the microswitches $MS_3$ and $MS_4$ are assumed to be in their "1" state when engaged with radially enlarged portions of the respective cams 108 and 109 and in their "0" states when engaged with radially reduced portions of the respective cams, then the above described arrangements of cams 108 and 109 cause microswitches $MS_3$ and $MS_4$, respectively, to be in their "1" and "0" states with control gear 41' in its stop position, in their "1" and "1" states during lead-in movement of control gear 41', in their "0" and "0" states with control gear 41' in its play position, and in their "0" and "1" states during return movement of the control gear, as shown on FIGS. 16A and 16B. It will be apparent that, from the foregoing states of microswitches $MS_3$ and $MS_4$, the stop mode, the lead-in mode, the play mode and the return mode of control mechanism 33 can be easily detected by a suitable logic circuit, as hereinafter described.

As shown on FIG. 17, the two microswitches need not be disposed immediately above each other, for example, the microswitch $MS'_4$ may be angularly displaced by the angle $\theta$ in advance of the microswitch $MS'_3$, considered in the direction of rotation of the respective control gear 41". In such case, the radially reduced cam portions 109'a and 109'b of the cam associated with microswitch $MS'_4$ are similarly shifted by the angle $\theta$ in respect to the radially reduced cam portion 108'a associated with microswitch $MS'_3$ so that the states of the microswitches $MS'_3$ and $MS'_4$ will have the same relationships to the various modes of control mechanism 33 as are illustrated on FIGS. 16A and 16B.

Figure 12:
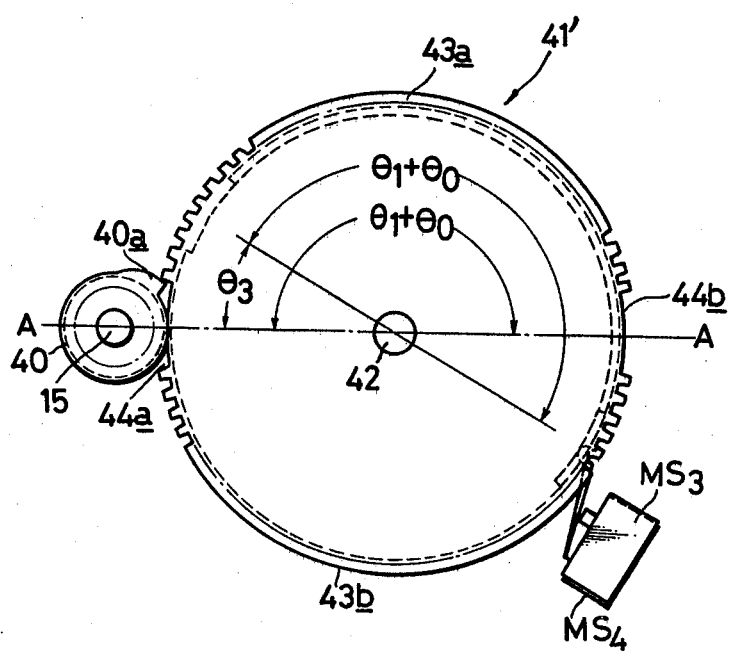
FIG. 12 is a view similar to that of FIG. 5A, but showing another sensor arrangement associated with the control gear for detecting the various modes or stages of operation of the record player in accordance with still another embodiment of this invention.
Figure 13:
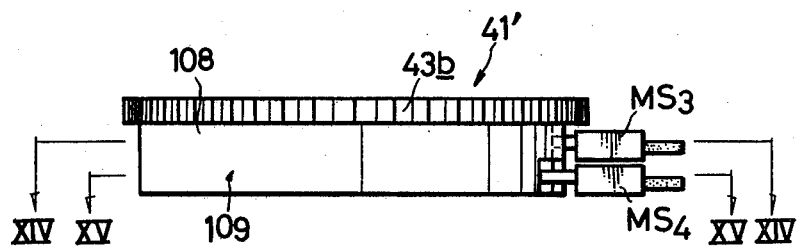
FIG. 13 is a side elevational view of the control gear and sensor arrangement of FIG. 12.
Figure 14:
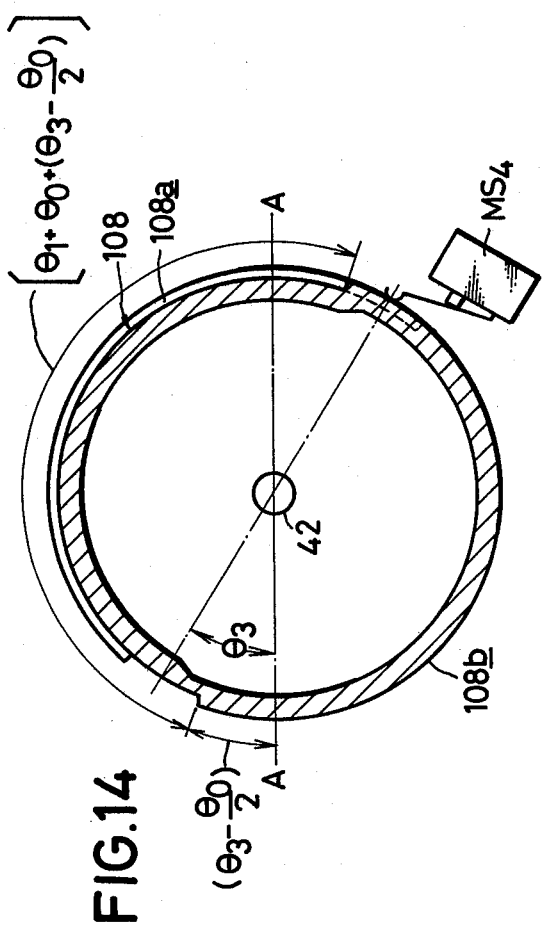
Figure 18:
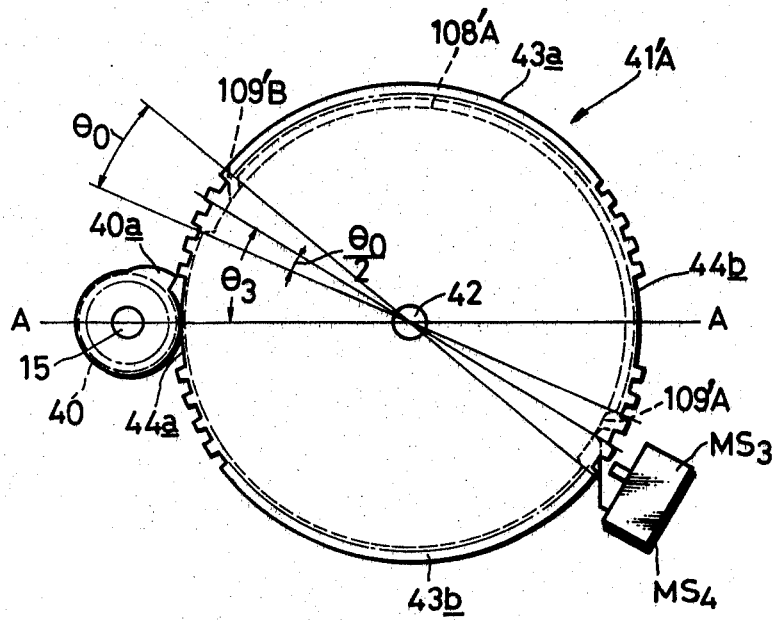

Further, as shown on FIG. 18, with microswitches $MS_3$ and $MS_4$ disposed immediately above each other as on FIGS. 12 and 13, the radially reduced cam portions 109'A and 109'B associated with microswitch $MS_4$ may have the same positional relationships to the diametrical line A—A as have been described above with reference to the cam portions 109a and 109b on FIG. 15, while the radially reduced cam portion 108'A associated with microswitch $MS_3$ is shifted by the angle $\theta_0/2$ from the position of cam portion 108a described with respect to FIG. 14. Given the arrangement of the cams as shown on FIG. 18, the states of microswitches $MS_3$ and $MS_4$ will respectively be "0" and "0" in the stop position of the respective control gear 41'A, "1" and "1" during lead-in movement of control gear 41'A, "1" and "0" in the play position of the control gear, and "0" and "1" during return movement of the control gear. Once again, a suitable logic circuit may be easily provided for detecting the stop, lead-in, play and return modes of control mechanism 33 from the foregoing states of microswitches $MS_3$ and $MS_4$.

In the arrangements for detecting the various modes of control mechanism 33 as described above with reference to FIGS. 12-18, the cams for controlling the microswitches $MS_3$ and $MS_4$ or $MS'_3$ and $MS'_4$ have been defined by indentations in the circumferential surface of the control gear for forming the radially reduced portions of the respective cams. However, it will be apparent that similarly arranged cams can be defined by providing the circumferential surface of the control gear with radial projections thereon.

Figure 19:
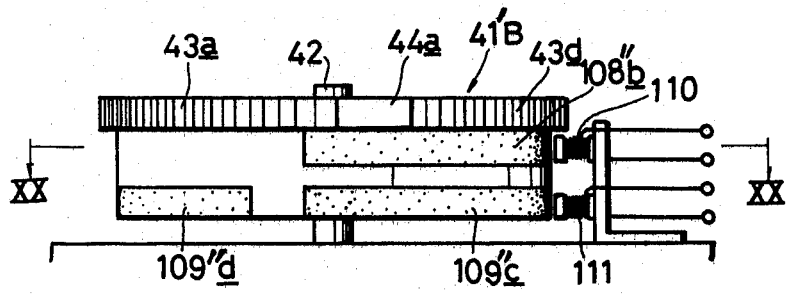
FIG. 19 is a view similar to that of FIG. 13, but showing still another modification of the sensor arrangement.
Figure 20:
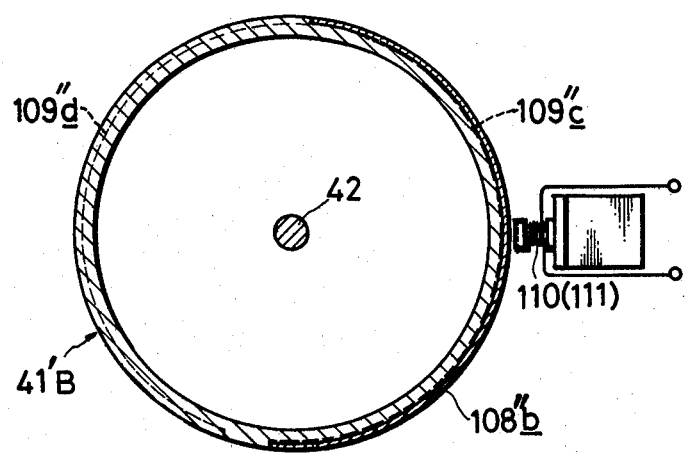
FIG. 20 is a sectional view taken along the line XX—XX on FIG. 19.

Furthermore, the various positions of the control gear, and hence the various operating modes of control mechanism 33, may be magnetically detected by an arrangement that does not require any physical contact with the control gear. Thus, for example, as shown on FIGS. 19 and 20, a control gear 41'B which is otherwise similar to the control gear 41 is provided with a magnetized rubber band 108"b and magnetized rubber bands 109"c and 109"d which correspond in angular extent and positioning to the radially enlarged cam portions 108b, 109c and 109d, respectively, on FIGS. 14 and 15, and which are adapted to be magnetically detected, for example, by saturable inductors 110 and 111 arranged one above the other adjacent the periphery of control gear 41'B at a location corresponding to that of the microswitches $MS_3$ and $MS_4$ of FIGS. 12 and 13.

Figure 21:
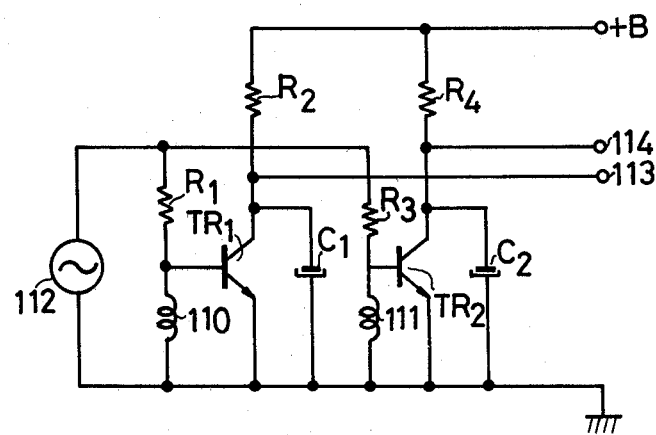
FIG. 21 is a circuit diagram of a detecting circuit to be employed with the sensor arrangement of FIGS. 19 and 20 for detecting the operating stages or modes of the record player.

The saturable inductors 110 and 111 may be connected to a detecting circuit, as shown on FIG. 21, and in which a signal, for example, of 100 KHz, is supplied from an oscillator 112 through resistors $R_1$ and $R_3$ to ends of saturable inductors 110 and 111 and to the base electrodes of transistors $TR_1$ and $TR_2$, respectively. A voltage source $+B$ is connected through load resistors $R_2$ and $R_4$ to the collector electrodes of transistors $TR_1$ and $TR_2$, respectively. The collector electrodes of transistors $TR_1$ and $TR_2$ are further connected to ground through capacitors $C_1$ and $C_2$, and to output terminals 113 and 114, respectively. The emitter electrodes of transistors $TR_1$ and $TR_2$ and the other ends of inductors 110 and 111 are connected to ground.

In the detecting circuit of FIG. 21, the transistor $TR_1$ is in its OFF state when the saturable inductor 110 is confronted by the magnetized rubber band 108"b, that is, when control gear 41'B is in its stop position and during lead-in movement of such control gear. When transistor $TR_1$ is in its OFF state, the output voltage at terminal 113 is nearly equal to the supply voltage from the source $+B$, and thus corresponds to the "1" state of microswitch $MS_3$ on FIG. 16A. On the other hand, when control gear 41'B is in its play position and during return movement of such control gear, that is, when the magnetized rubber band 108"b is away from saturable inductor 110, the inductance of the latter is increased. As a result of the foregoing, the base voltage of transistor $TR_1$ is increased to change-over the latter to its ON state, whereby the collector voltage of transistor $TR_1$ is decreased and the output voltage at terminal 113 corresponds to the "0" state of microswitch $MS_3$ on FIG. 16A.

Similarly, when the magnetized rubber band 109"c or 109"d confronts saturable inductor 111 during the lead-in or return movements, respectively, of control gear 41'B, transistor $TR_2$ is in its OFF state so that a relatively high voltage appears at the respective output terminal 114 for correspondence with the "1" state of the microswitch $MS_4$ on FIG. 16B. On the other hand, when neither of the magnetic rubber bands 109"c and 109"d confronts saturable inductor 111, as when the control gear is in its stop position or play position, transistor $TR_2$ is in its ON state so that a relatively low voltage appears at output terminal 114 in correspondence to the "0" state of microswitch $MS_4$.

It will be apparent that, in the detecting circuit of FIG. 21, the 100 KHz output of oscillator 112 is converted into waves similar to a DC voltage at the collector electrodes of transistors $TR_1$ and $TR_2$ by means of the capacitors $C_1$ and $C_2$. In any case, it will be apparent that the outputs at terminals 113 and 114 may be applied to a suitable logic circuit for detecting therefrom the various operating modes of control mechanism 33.

Figure 22:
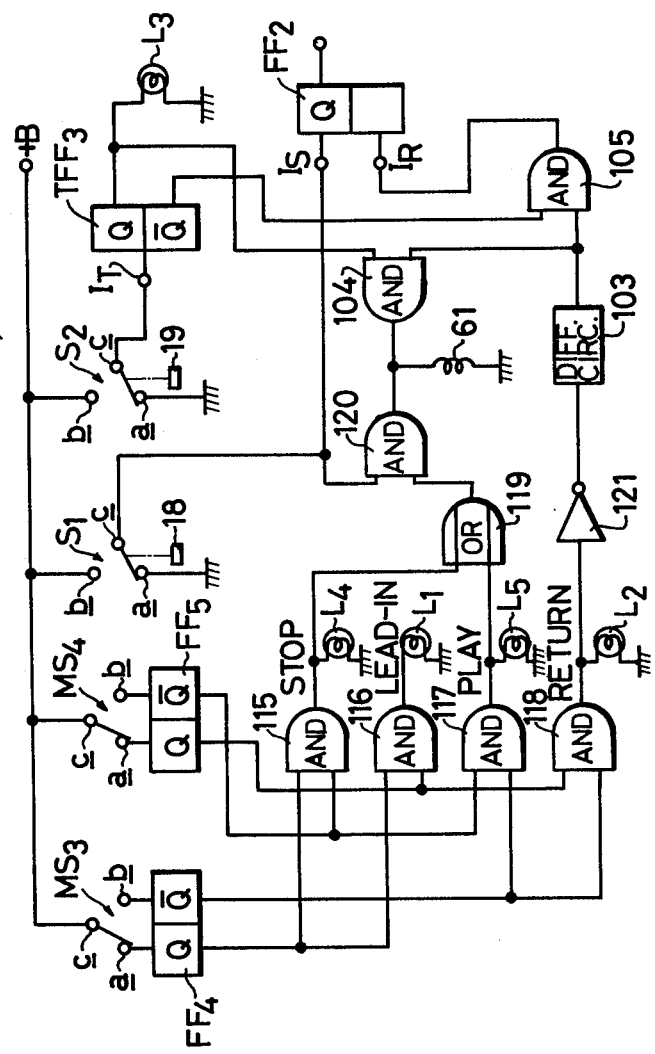
FIG. 22 is a circuit diagram of a control circuit according to another embodiment of the invention to be employed with a record player having the sensor arrangement of FIGS. 12-15.

Referring now to FIG. 22, it will be seen that, in a control circuit 300 according to this invention for use with the detecting or sensor arrangement of FIGS. 12–15, each of the microswitches $MS_3$ and $MS_4$ includes fixed contacts $a$ and $b$ and a movable contact $c$ which, in the "1" state of the respective microswitch engages the respective fixed contact $a$, and is changed-over to engage the respective fixed contact $b$ in the "0" state of the respective microswitch. The fixed contacts $a$ and $b$ of microswitches $MS_3$ and $MS_4$ are shown to be connected to the set and reset terminals of respective flip-flops $FF_4$ and $FF_5$. The movable contacts $c$ of microswitches $MS_3$ and $MS_4$ are connected to the voltage source $+B$. Thus, when microswitch $MS_3$ is in its "1" state (FIG. 16A), flip-flop $FF_4$ is set to make its outputs Q and $\overline{Q}$ "1" and "0", respectively, and conversely when microswitch $MS_3$ is in its "0" state, the outputs Q and $\overline{Q}$ of flip-flop $FF_4$ are respectively "0" and "1". Similarly, when microswitch $MS_4$ is in its "1" state (FIG. 16B), outputs Q and $\overline{Q}$ of the associated flip-flop $FF_5$ are "1" and "0" and, when microswitch $MS_4$ is in its "0" state, outputs Q and $\overline{Q}$ of flip-flop $FF_5$ are changed-over to "0" and "1".

The outputs Q and $\overline{Q}$ of flip-flop $FF_4$ are shown to be connected to inputs of AND circuits 115 and 116 and to inputs of AND circuits 117 and 118, respectively. Further, the outputs Q and $\overline{Q}$ of flip-flop $FF_5$ are connected to other inputs of AND circuits 116 and 118, and to other inputs of AND circuits 115 and 117, respectively. Thus, with the cams 108 and 109 being arranged on control gear 41' so as to provide the relationships between the positions of the control gear and the states of microswitches $MS_3$ and $MS_4$ as illustrated on FIGS. 16A and 16B, AND circuit 115 provides an output only when control gear 41' is in its stop position, AND circuit 116 provides an output only during lead-in movement of control gear 41', AND circuit 117 provides an output only when control gear 41' is in its play position, and AND circuit 118 provides an output only during return movement of control gear 41'.

Further, in the control circuit 300, the outputs of AND circuits 115 and 117 are connected to respective inputs of an OR circuit 119 having its output connected to an input of an AND circuit 120 which, at another input thereof, is connected to the movable contact $c$ of the switch $S_1$ actuable by the start/stop switch actuator 118. The output of AND circuit 120 is connected to the electro-magnet 61, and the movable contact $c$ of switch $S_1$ is further shown to be connected directly to the set input terminal $I_S$ of the motor controlling flip-flop $FF_2$. The output of AND circuit 118 is shown to be connected through an inverter 121 to the differential circuit 103 so that the output of inverter 121 is changed from "1" to "0" during the return movement of control gear 41' and is changed back to "1" at the completion of such return movement so as to cause differential circuit 103 to provide an output pulse at that time. The outputs of AND circuits 116 and 118 are connected to lamps $L_1$ and $L_2$, respectively, for illuminating such lamps during the lead-in and return operations, respectively, of the record player. Similarly, the outputs of AND circuits 115 and 117 are connected to additional lamps $L_4$ and $L_5$, respectively, for illuminating such lamps when the record player is in its stop mode and in its play mode, respectively.

The remainder of the control circuit 300 is generally similar to the corresponding portion of the control circuit 200 previously described with reference to FIG. 11 and has its corresponding elements identified by the same reference numerals and letters. Thus, in control circuit 300, the movable contact $c$ of switch $S_2$ actuable by the repeat/repeat-halt switch actuator 19 is connected to the trigger input terminal $I_T$ of the toggle flip-flop $TFF_3$ which has its Q output connected to lamp $L_3$ and to AND circuit 104 which is also connected to the output of differential circuit 103, while the output $\overline{Q}$ of toggle flip-flop $TFF_3$ is applied to AND circuit 105 which also receives the output of differential circuit 103 and which has its output connected to the reset input terminal $I_R$ of flip-flop $FF_2$.

It will be apparent that, in the control circuit 300, a repeat command signal and a repeat-halt command signal generated by successive actuations of switch $S_2$ by switch actuator 19 are alternatively retained or memorized by toggle flip-flop $TFF_3$ so that the repeat and repeat-halt operations of circuit 300 are substantially similar to the corresponding operations of control circuit 200 as described above with reference to FIG. 11. In other words, in response to a repeat command signal from switch $S_2$, toggle flip-flop $TFF_3$ assumes the state in which its outputs Q and $\overline{Q}$ are respectively "1" and "0" for retaining or memorizing the repeat command signal. So long as toggle flip-flop $TFF_3$ is in such state for memorizing the repeat command signal, lamp $L_3$ is illuminated and, upon completion of each return operation of control mechanism 33, the resulting output from differential circuit 103 passes through AND circuit 104 for energizing electromagnet 61 and thereby initiating a lead-in operation. Furthermore, the output or pulse from differential circuit 103 upon the completion of a return operation is blocked at AND circuit 105 so that flip-flop $FF_2$ remains in its set state for continuing the operation of motor 30. Thus, after a repeat command signal has been generated at any stage of the automatic operating cycle of record player 10, such automatic operating cycle will be repeated until such time as switch $S_2$ is again actuated for generating a repeat-halt command signal. Such repeat-halt command signal may be generated at any stage of an automatic operating cycle for changing-over toggle flip-flop $TFF_3$ to its state in which outputs Q and $\overline{Q}$ thereof are respectively "0" and "1" for memorizing the repeat-halt command signal. Thereafter, at the completion of the return operation of the automatic operating cycle during which the repeat-halt command signal was generated, the output of differential circuit 103 is passed through AND circuit 105 to the reset input terminal $I_R$ of flip-flop $FF_2$ for resetting the latter and thereby halting operation of motor 30. Further, with the repeat-halt command signal memorized or retained in toggle flip-flop $TFF_3$, the output of differential circuit 103 which signifies the completion of a return operation is blocked at AND circuit 104 so that electro-magnet 61 is not energized thereby for initiating a lead-in operation.

The operation of control circuit 300 differs substantially from that of the previously described control circuit 200 in that no provision is made for memorizing or temporarily retaining a stop command signal generated in response to actuation of switch $S_1$. In other words, with the record player in its stop condition, actuation of switch $S_1$ by start/stop switch actuator 18 is effective to generate a start command signal which sets flip-flop $FF_2$ and thereby causes operation of motor 30. With control gear 41' in its stop position, the output of AND circuit 115 is applied through OR circuit 119 to AND circuit 120 so that the start command signal is passed through AND circuit 120 for energizing electromagnet 61 and thereby initiating a lead-in operation. During such lead-in operation, neither of the AND circuits 115 and 117 provides an output so that, if switch $S_1$ is actuated during the lead-in operation for generating a stop command signal, the latter will not be passed through AND circuit 120 for energizing electromagnet 61. However, upon completion of the lead-in operation, that is, during a play operation, the output of AND circuit 117 is passed through OR circuit 119 to AND circuit 120. Therefore, further actuation of switch $S_1$ during the play operation will generate a stop command signal which is passed through AND circuit 120 for energizing electro-magnet 61 and thereby initiating a return operation by which the automatic operating cycle of the record player is aborted. So long as toggle flip-flop $TFF_3$ is not retaining or memorizing a repeat command signal, upon completion of a return operation, either at the end of an automatic operating cycle or in response to a stop command signal from switch $S_1$, the resulting output of differential circuit 103 will be passed through AND circuit 105 for resetting flip-flop $FF_2$ and thereby halting operation of motor 30.

Figure 23A:
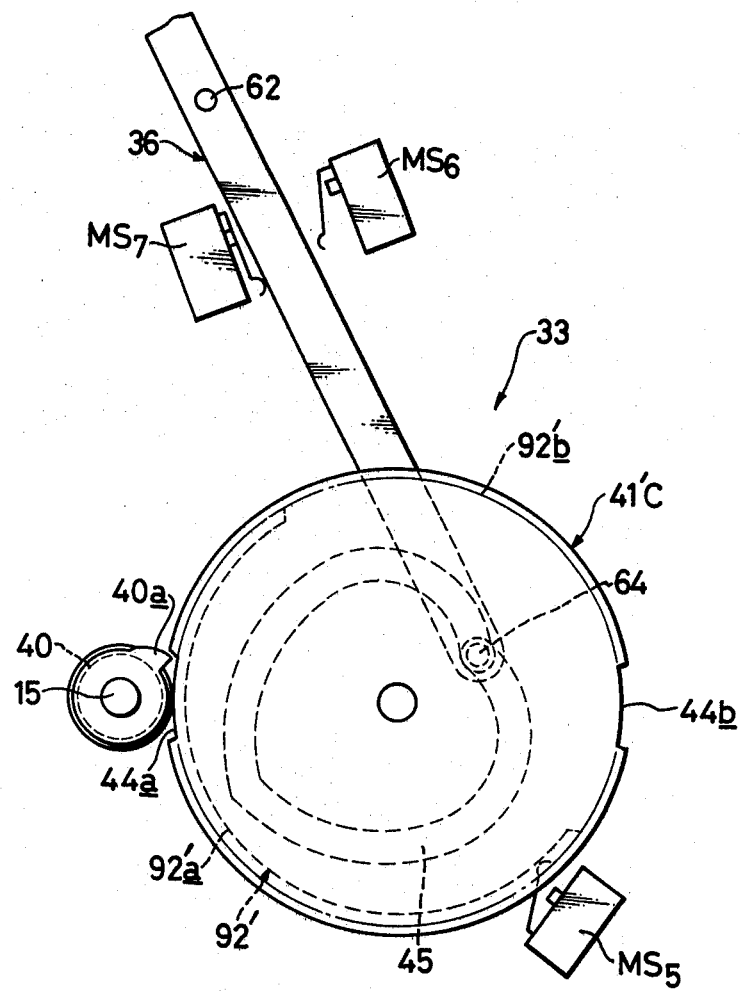

Referring now to FIGS. 23A and 23B in which the main lever 36 of control mechanism 33 is shown schematically in simplified form in its stop and play positions, respectively, it will be seen that still another detecting or sensor arrangement for detecting the various modes of control mechanism 33 may include a microswitch $MS_5$ controllable by a radial cam 92' provided on the respective control gear 41'C, and microswitches $MS_6$ and $MS_7$ which are controllable by the main lever 36. More particularly, the radial cam 92' on control gear 41'C is shown to have a radially cut-in or reduced portion 92'a which is engageable by microswitch $MS_5$ in the stop and play positions of the control gear and during return movement of the latter so as to establish the "0" state of microswitch $MS_5$ (FIG. 24A), and a radially enlarged portion 92'b engageable by microswitch $MS_5$ only during the return movement of control gear 41'C for establishing the "1" state of such microswitch only during the return movement. The microswitch $MS_6$ is suitably mounted so as to be engaged by main lever 36 only in the play position of the latter for establishing the "1" state of microswitch $MS_6$ (FIG. 24B), and main lever 36 is free of microswitch $MS_6$ for establishing the "0" state of the latter during the lead-in and return movements of main lever 36 and when the latter is in its stop position. Conversely, microswitch $MS_7$ is positioned so as to be engaged by main lever 36 for establishing the "1" state of microswitch $MS_7$ only when main lever 36 is in its stop position (FIG. 24C), and main lever 36 is free of microswitch $MS_7$ during the lead-in and return movements of lever 36 and when the latter is in its play position so as to establish the "0" state of microswitch $MS_7$.

Figure 25:
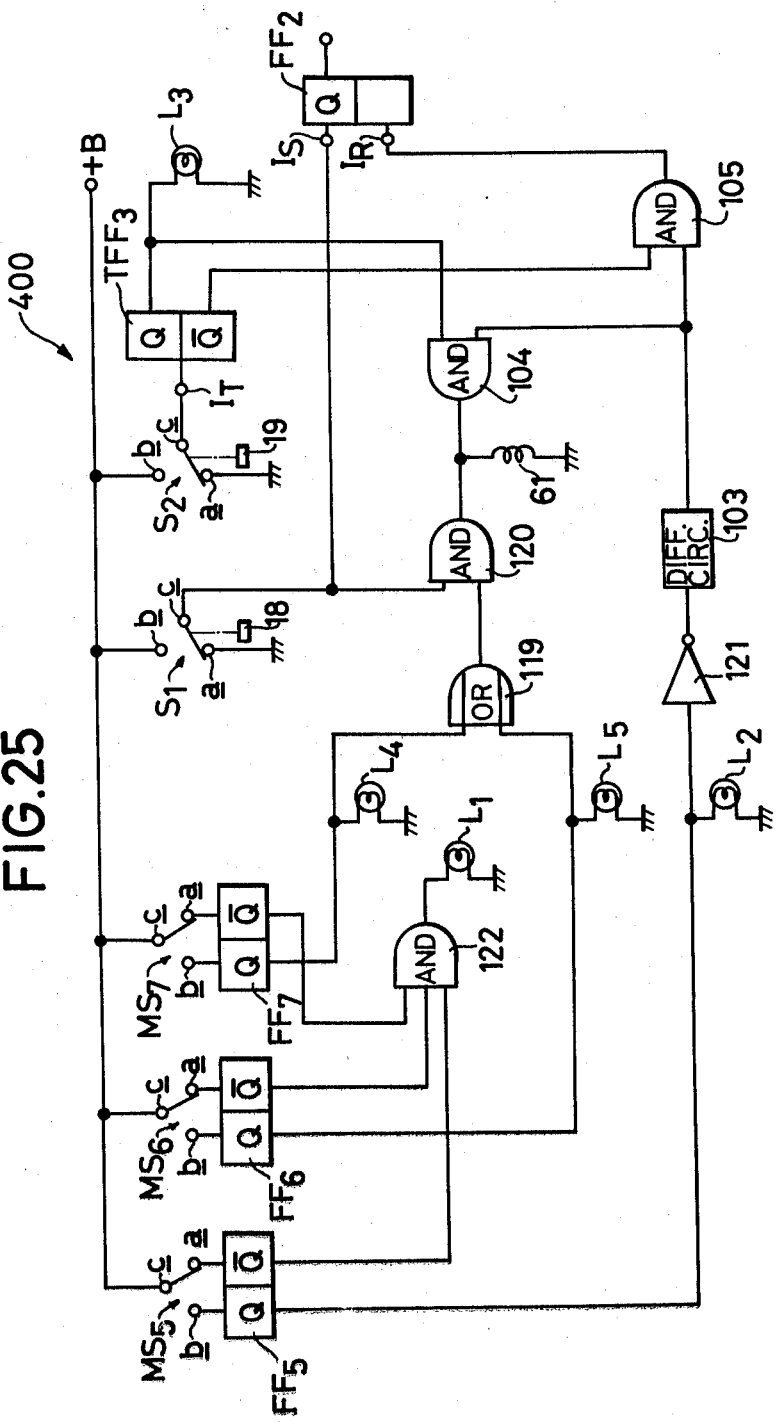
FIG. 25 is a circuit diagram of a control circuit according to still a further embodiment of this invention which is to be employed with a record player having the sensor arrangement of FIGS. 23A and 23B.

Referring now to FIG. 25, it will be seen that, in a control circuit 400 according to this invention which employs the detecting or sensor arrangement of FIGS. 23A and 23B, each of the microswitches $MS_5$, $MS_6$ and $MS_7$ is shown to have a movable contact $c$ connected to the voltage source +B and being engageable with a respective fixed contact $a$ in the "+0" state of the microswitch, with the movable contact $c$ being changed-over to engage a respective fixed contact $b$ in the "1" state of the respective microswitch. Further, as shown, the fixed contacts $a$ and $b$ of microswitches $MS_5$, $MS_6$ and $MS_7$ are respectively connected to reset and set inputs of flip-flops $FF_5$, $FF_6$ and $FF_7$, respectively. It will be apparent that each of flip-flops $FF_5$, $FF_6$ and $FF_7$ is in its reset state to provide outputs Q and $\overline{Q}$ of "0" and "1" when the respective microswitch $MS_5$, $MS_6$ or $MS_7$ is in its "0" state, whereas the change-over of each of the microswitches to its "1" state is effective to set the respective flip-flop $FF_5$, $FF_6$ or $FF_7$ and thereby provide such flip-flop with outputs Q and $\overline{Q}$ of "1" and "0", respectively.

Figures 24A, 24B, 24C:
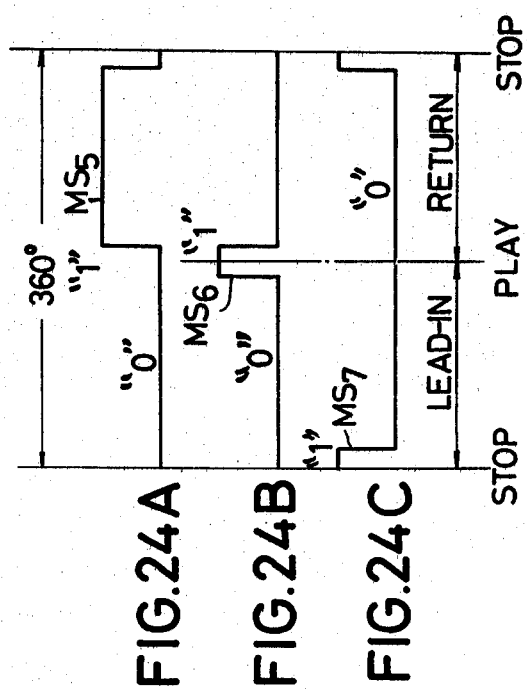
FIGS. 24A-24C are wave forms to which reference will be made in explaining the operation of the sensor arrangement of FIGS. 23A and 23B.

As is further shown on FIG. 25, the Q outputs of flip-flops $FF_5$, $FF_6$ and $FF_7$ are all connected to respective inputs of an AND circuit 112 having its output connected to lamp $L_1$ for illuminating the latter during the lead-in operation of control mechanism 33, at which time, all of the microswitches are in their "0" states as shown on FIGS. 24A, 24B and 24C. The output Q of flip-flop $FF_5$ which is "1" only during the return movement of control gear 41'C is connected to lamp $L_2$ for illuminating the latter during the return operation, while the outputs Q of flip-flops $FF_6$ and $FF_7$ which are respectively "1" only in the play and stop modes are respectively connected to the lamps $L_5$ and $L_4$ so that the lamps $L_4$ and $L_5$ are illuminated only in the stop and play modes of the record player. The remainder of control circuit 400 is composed of elements identified by the same reference numerals and letters as were employed in connection with the corresponding elements of control circuit 300 on FIG. 22. Thus, more particularly, in control circuit 400, the Q output of flip-flop $FF_5$ is applied to inverter 121, while the Q outputs of flip-flops $FF_6$ and $FF_7$ are applied to respective inputs of OR circuit 119.

It will be understood that the operations of control circuit 400 are generally similar to the corresponding operations of the previously described control circuit 300. Thus, more particularly, in the stop condition of the record player as detected by microswitch $MS_7$, a start command signal generated by actuation of switch $S_1$ is passed through AND circuit 120 for energizing electro-magnet 61 and thereby initiating the lead-in operation. A stop command signal generated by actuation of switch $S_1$ during the lead-in operation is blocked at AND circuit 120, and hence is not effective to energize electromagnet 61. However, at the completion of the lead-in operation, that is, during a play operation of the record player as detected by microswitch $MS_6$, a stop command signal generated by actuation of switch $S_1$ passes through AND circuit 120 and energizes electro-magnet 61 for initiating the return operation and thereby aborting the automatic operating cycle of the record player. Upon completion of the return operation, either at the end of the normal automatic operating cycle or when the automatic operating cycle is aborted by a stop command signal, the resulting output from differential circuit 103 is passed through AND circuit 105 for resetting flip-flop $FF_2$ and thereby halting operation of motor 30. Furthermore, in the control circuit 400 of FIG. 25, the toggle flip-flop $TFF_3$ is operative in the same manner as in control circuit 300 for temporarily retaining or alternatively memorizing repeat and repeat-halt command signals generated by successive actuations of switch $S_2$ at any stages of the automatic operating cycle. As previously described, so long as toggle flip-flop $TFF_3$ memorizes a repeat command signal, the output or pulse from differential circuit 103 upon completion of a return operation is blocked at AND circuit 105 and is passed through AND circuit 104 for energizing electro-magnet 61 and thereby initiating a new lead-in operation. On the other hand, when toggle flip-flop $TFF_3$ memorizes a repeat-halt command signal, the output of differential circuit 103 signifying the completion of a return operation is passed through AND circuit 105 for resetting flip-flop $FF_2$ and thereby halting operation of motor 30.

In the control circuits 300 and 400 of FIGS. 22 and 25, only a single memory unit or toggle flip-flop $TFF_3$ has been provided for temporarily retaining or memorizing the repeat and repeat-halt command signals. However, it will be understood that such control circuits 300 and 400 may also be provided with a memory unit, for example, similar to the toggle flip-flop $TFF_1$ of the control circuit 200 on FIG. 11, for temporarily retaining or memorizing a stop command signal from switch $S_1$. In the event of such modification of the circuits 300 and 400, a stop command signal for aborting the automatic operating cycle may be generated during a lead-in operation and is memorized until the completion of the lead-in operation, whereupon the electro-magnet 61 is energized to initiate the return operation as described previously in connection with the control circuit 200.

Although a single switch $S_1$ has been employed in the described control circuits 100, 200, 300 and 400 for generating the start and stop command signals, it will be apparent that separate switches may be employed for producing the start and stop command signals, respectively. Similarly, separate switches can be employed for generating the repeat and repeat-halt command signals, respectively, in place of the single switch $S_2$ which, upon successive actuations, generates the repeat and repeat-halt command signals in the control circuits 200, 300 and 400. Further, although the switches $S_1$ and $S_2$ have been described as being of the soft-touch type, so as to be actuable by merely a light pressure applied to the respective switch actuators 18 and 19, other types of switches may readily be employed.

Having described illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a phonograph record player having a rotatable turntable for supporting a phonograph record during the playing thereof, drive means including an electric motor operable for rotating said turntable, and a tone arm assembly including a tone arm carrying a pickup with a stylus to track the groove of a phonograph record on said turntable during playing of the record and being mounted for lateral swinging across said turntable and for raising and lowering of the tone arm relative to said turntable: control means capable of a lead-in operation for effecting lead-in movement of said tone arm from an elevated rest position outside the perimeter of said turntable to a set-down position on a record supported by said turntable so as to commence said playing of the record, and a return operation for effecting a return movement of said tone arm to said rest position from a position on the record, said control means comprising a drive gear rotatable by said drive means;
a rotatable control gear;
clutch means actuable for engaging said control gear with said drive gear and thereby causing turning of said control gear from a stop position to a play position in said lead-in operation and from said play position to said stop position in said return operation;
lever means engaged with said control gear and being swingable by the latter for effecting said lead-in and return movements of the tone arm in response to said turning of the control gear in said lead-in and return operations, respectively;
trigger means operable to actuate said clutch means with said control gear in said stop and play positions thereof; p1 manually actuable means for generating an electrical command signal;
memory means for retaining said command signal and providing a corresponding memory output;
sensor means for detecting completion of at least one of said lead-in and return operations and providing a corresponding sensor output; and
means for electrically operating said trigger means in response to the simultaneous occurrence of said memory output and said sensor output.

2. A phonograph record player according to claim 1; in which said control gear has first and second sets of peripheral teeth engageable by said drive gear for respectively effecting said turning of the control gear in said lead-in and return operations and being separated from each other by diametrically opposed first and second toothless gaps which, when facing toward said drive gear in said stop and play positions, respectively, permit the latter to remain at rest while said drive gear continues to rotate; said clutch means includes individual lead-in and return clutches mounted on said control gear at diametrically opposed locations, said lead-in and return clutches having disengaged positions and engaged positions in which said lead-in and return clutches are respectively operative for initiating movements of said control gear from said stop and play positions thereof; and said trigger means includes a single actuating slide which is, at least in part, of a magnetic material, and is movable from an inoperative position to an operative position for selectively actuating said lead-in and return clutches to the respective engaged positions when said control gear is in said stop and play positions, respectively, and electro-magnetic means energizable upon the electrical operation of said trigger means to provide a magnetic field for moving said slide to said operative position of the latter.

3. A phonograph record player according to claim 1; in which said manually actuable means is selectively actuable for generating a start command signal and a stop command signal, said memory means includes a memory unit which alternatively retains said start and stop command signals and provides first and second memory outputs, respectively, said sensor means detects completion of said lead-in operation to provide said corresponding sensor output, and said means for electrically operating the trigger means includes AND circuit means receiving said second memory output and said sensor output so as to operate said trigger means for initiating said return operation at the completion of said lead-in operation in the event that said stop command signal has been generated during said lead-in operation.

4. A phonograph record player according to claim 3; further comprising indicating means energized by said first memory output for indicating said lead-in operation.

5. A phonograph record player according to claim 3; in which said sensor means includes switch means actuated by said lever means at the completion of the swinging of the latter by said control gear in response to turning of said control gear in said lead-in operation.

6. A phonograph record player according to claim 3; in which said sensor means includes cam means turnable with said control gear, and switch means actuable by said cam means when said control gear attains said play position thereof.

7. A phonograph record player according to claim 3; in which said sensor means also includes means detecting completion of said return operation to provide a second sensor output; and further comprising motor control means receiving said first memory output to establish a first state for causing operation of said electric motor and receiving said second sensor output to establish a second state for halting operation of said electric motor.

8. A phonograph record player according to claim 7; in which said means detecting completion of said return operation includes switch means having a normal first condition and being changed-over to a second condition during said return operation, and means responsive to the restoration of said switch means from said second condition back to said first condition at the completion of said return operation for producing said second sensor output.

9. A phonograph record player according to claim 8; further comprising indicating means energized in response to said second condition of said switch means for indicating said return operation.

10. A phonograph record player according to claim 8; further comprising means responsive to said second condition of said switch means for preventing replacement of said start command signal by said stop command signal in said memory means during said return operation.

11. A phonograph record player according to claim 8; in which said means detecting completion of said return operation further includes cam means turnable with said control gear and changing over said switch means from said first condition to said second condition only during turning of said control gear between said play and stop positions thereof in said return operation.

12. A phonograph record player according to claim 7; further comprising means for operating said trigger means upon completion of said playing of the record so as to automatically initiate said return operation.

13. A phonograph record player according to claim 12; in which said manually actuable means is further selectively actuable for generating a repeat command signal and a repeat-halt command signal; said memory means further includes a second memory unit which alternatively retains said repeat and repeat-halt command signals and provides first and second memory outputs, respectively; said means for electrically operating the trigger means further includes second AND circuit means receiving said first memory output from said second memory unit and said second sensor output so as to operate said trigger means for initiating said lead-in operation at the completion of said return operation in the event that said repeat command signal has been previously generated; and said second sensor output is supplied to said motor control means through third AND circuit means which further receives said second memory output from said second memory unit so that said second state of the motor control means is established for halting operation of said electric motor upon completion of said return operation only when said second memory unit retains said repeat-halt command signal so as to provide said second memory output therefrom.

14. A phonograph record player according to claim 13; further comprising indicating means energized by said first memory output from said second memory unit for indicating selection of a repeat mode of operation.

15. A phonograph record player according to claim 13; in which said first and second memory units are constituted by first and second toggle flip-flops, respectively, each having first and second alternative states corresponding to said first and second memory outputs of the respective memory unit, said first flip-flop has a trigger input receiving the selectively generated start and stop command signals and a reset input connected with the output of said third AND circuit means so as to establish said second state of the first flip-flop when operation of said electric motor is halted, and said second flip-flop has a trigger input receiving the selectively generated repeat and repeat-halt command signals and a reset input receiving said second memory output of said first memory unit so that said second memory unit is prevented from retaining said repeat command signal when said first memory unit retains said stop command signal.

16. A phonograph record player according to claim 1; further comprising means for operating said trigger means upon completion of said playing of the record so as to initiate said return operation, and motor control means having a first state for causing operation of said electric motor and a second state for halting operation of said electric motor; and in which said manually actuable means is selectively actuable for generating a start command signal, a repeat command signal and a repeat-halt command signal, said start command signal is applied to said motor control means for establishing said first state of the latter and is adapted to electrically operate said trigger means for initiating said lead-in operation; said memory means includes a memory unit which alternatively retains said repeat and repeat-halt command signals and provides first and second memory outputs, respectively; said sensor means detects completion of said return operation to provide said corresponding sensor output; said means for electrically operating said trigger means includes AND circuit means receiving said first memory output and said sensor output so as to operate said trigger means for initiating said lead-in operation anew at the completion of said return operation in the event that said repeat command signal has been previously generated; and said second memory output and said sensor output are applied to a second AND circuit means to provide an output from the latter for establishing said second state of the motor control means, and thereby halting operation of said electric motor, upon completion of said return operation in the event that said memory unit retains said repeat-halt command signal.

17. A phonograph record player according to claim 16; further comprising indicating means energized by said first memory output for indicating selection of a repeat mode of operation.

18. A phonograph record player according to claim 16; in which said manually actuable means is further selectively actuable for generating a stop command signal, said sensor means also includes means detecting said stop and play positions of the control gear and providing second and third sensor outputs, respectively; and further comprising OR circuit means receiving said second and third sensor outputs to provide an OR output in each of said stop and play positions of the control gear, and third AND circuit means receiving said start and stop command signals and said OR output and being interposed in said means for electrically operating said trigger means so that said lead-in operation is initiated by said start command signal with said control gear in said stop position and said return operation is initiated by said stop command signal with said control gear in said play position.

19. A phonograph record player according to claim 18; in which said memory unit is constituted by a toggle flip-flop having a trigger input receiving said repeat and repeat-halt command signals.

20. A phonograph record player according to claim 18; in which said sensor means includes first switch means having first and second states, cam means rotatable with said control gear to change-over said first switch means from said first state to said second state only during turning of said control gear from said play position to said stop position in said return operation, means responsive to the return of said first switch means from said second state to said first state for producing the first mentioned sensor output.

21. A phonograph record player according to claim 20; in which said sensor means further includes second and third switch means each having first and second states and being actuable from said first state to said second state by said lever means only at the completion of the swinging of said lever means in said return and lead-in operations, respectively, and means providing said second and third sensor outputs in response to the second states of said second and third switch means, respectively.

22. A phonograph record player according to claim 21; further comprising means for indicating a lead-in operation in response to the simultaneous occurrence of said first states of said first, second and third switch means.

23. A phonograph record player according to claim 18; in which said sensor means includes first and second switch means each having first and second states, first and second cam means rotatable with said control gear for actuating said first and second switch means, respectively, said first cam means changing-over said first switch means from said first state to said second state thereof only in said stop-position of the control gear and during the turning of the latter in said lead-in operation, said second cam means changing-over said second switch means from said first state to said second state thereof only during turning of the control gear in said lead-in and return operations, means providing said second sensor output in response to the simultaneous occurrence of said first and second states of said second and first switch means, respectively, means providing said third sensor output in response to the simultaneous occurrence of said first states of said first and second switch means, means providing a return operation signal in response to the simultaneous occurrence of said first and second states of said first and second switch means, respectively, and means providing the first mentioned sensor output in response to the termination of said return operation signal.

24. A phonograph record player according to claim 23; further comprising means for indicating a lead-in operation in response to the simultaneous occurrence of said second states of said first and second switch means.

* * * * *